(12) United States Patent
Toyoda et al.

(10) Patent No.: US 7,633,523 B2
(45) Date of Patent: Dec. 15, 2009

(54) IMAGE CAPTURING DEVICE USING CORRECTION INFORMATION FOR PREVENTING AT LEAST A PART OF CORRECTION PROCESS FROM BEING PERFORMED WHEN IMAGE DATA IS CORRECTED AT AN EXTERNAL DEVICE

(75) Inventors: Tetsuya Toyoda, Tokyo (JP); Masayu Higuchi, Tokyo (JP)

(73) Assignee: Olympus Corporation, Tokyo (JP)

( * ) Notice: Subject to any disclaimer, the term of this patent is extended or adjusted under 35 U.S.C. 154(b) by 683 days.

(21) Appl. No.: 10/071,836

(22) Filed: Feb. 8, 2002

(65) Prior Publication Data

US 2002/0167592 A1 Nov. 14, 2002

(30) Foreign Application Priority Data

| Feb. 9, 2001 | (JP) | 2001-034575 |
| Feb. 9, 2001 | (JP) | 2001-034577 |
| May 16, 2001 | (JP) | 2001-146772 |
| May 16, 2001 | (JP) | 2001-146780 |

(51) Int. Cl.
*H04N 5/225* (2006.01)
(52) U.S. Cl. .................... 348/207.1; 348/231.6
(58) Field of Classification Search .......... 348/207.2, 348/207.99, 222.1, 231.99, 211.1, 207.1, 348/231.3, 220.1, 231.6, 207.11, 223.1, 228.1; 358/448, 906, 3.24, 1.15
See application file for complete search history.

(56) References Cited

U.S. PATENT DOCUMENTS

| 6,011,547 | A * | 1/2000 | Shiota et al. ............... 382/254 |
| 6,037,972 | A * | 3/2000 | Horiuchi et al. ............ 348/64 |
| 6,441,913 | B1 * | 8/2002 | Anabuki et al. ........... 358/1.12 |
| 6,535,243 | B1 * | 3/2003 | Tullis ........................ 348/207.1 |
| 6,563,542 | B1 * | 5/2003 | Hatakenaka et al. ... 348/333.02 |
| 6,597,468 | B1 * | 7/2003 | Inuiya ........................ 358/1.15 |

(Continued)

FOREIGN PATENT DOCUMENTS

JP 03-268583 A 11/1991

(Continued)

OTHER PUBLICATIONS

Notice of Rejection Grounds for Japanese Patent Application No. 2001-146780, mailed Aug. 4, 2009 (2 pgs.) with translation (1 pg.).

*Primary Examiner*—Lin Ye
*Assistant Examiner*—Nelson D. Hernández Hernández
(74) *Attorney, Agent, or Firm*—Straub & Pokotylo; John C. Pokotylo

(57) ABSTRACT

When shooting is made, an electronic camera selects a correction mode and a correction condition, which reflect the shooting intention of a user with the highest accuracy when a visible image is formed, based on a set shooting mode, a condition for image capturing at the time of shooting, and a camera mode. The electronic camera then associating the correction mode and the correction condition with the image data obtained by shooting, and records the mode and the condition in association with the image data on a memory card. When a printer prints an image based on the image data, it performs a process for a correction when a visible image is formed, based on the correction mode and the correction condition, which are associated with the image data.

9 Claims, 20 Drawing Sheets

U.S. PATENT DOCUMENTS

| | | | |
|---|---|---|---|
| 6,650,365 B1 * | 11/2003 | Sato | 348/231.3 |
| 6,657,658 B2 * | 12/2003 | Takemura | 348/207.99 |
| 6,771,896 B2 * | 8/2004 | Tamura et al. | 396/57 |
| 6,850,271 B1 * | 2/2005 | Ichikawa | 348/207.2 |
| 6,930,717 B1 * | 8/2005 | Kobayashi et al. | 348/333.02 |
| 6,965,410 B1 * | 11/2005 | Yamagishi | 348/362 |
| 2001/0013949 A1 * | 8/2001 | Tateyama | 358/1.16 |
| 2002/0196345 A1 * | 12/2002 | No | 348/207.2 |
| 2003/0007169 A1 * | 1/2003 | Tanaka et al. | 358/1.15 |
| 2003/0122933 A1 * | 7/2003 | Shiohara | 348/207.2 |
| 2003/0146978 A1 * | 8/2003 | Toyoda | 348/207.2 |

FOREIGN PATENT DOCUMENTS

| | | |
|---|---|---|
| JP | 09-130731 A | 5/1997 |
| JP | 10-200671 A | 7/1998 |
| JP | 10-226139 A | 8/1998 |
| JP | 11-239269 A | 8/1999 |
| JP | 2000-137806 | 5/2000 |

* cited by examiner

FIG. 4A

| | PRIO-RITY | ITEM | SETTING | CORRECTION MODE | | | | | | | | | |
|---|---|---|---|---|---|---|---|---|---|---|---|---|---|
| | | | | STAN-DARD | PORT-RAIT | LAND-SCAPE | SPORTS | TWILIGHT SCENE | NIGHT SCENE | BACK-LIGHT | MACRO | SEPIA | MONO-CHROME | NON-CORRECTION |
| CORRECTION MODE SELECTION INFORMATION (IMAGE CAPTURING CONDITION) / SHOOTING MODE SETTING | 1 | MOVING IMAGE MODE | MOVING IMAGE | | | | | | | | | | | O |
| | 2 | SCENE MODE | PORTRAIT | | O | | | | | | | | | |
| | | | SNAP | | O | | | | | | | | | |
| | | | LANDSCAPE | | | O | | | | | | | | |
| | | | SPORTS | | | | O | | | | | | | |
| | | | TWILIGHT SCENE | | | | | O | | | | | | |
| | | | NIGHT SCENE | | | | | | O | | | | | |
| | | | MACRO | | | | | | | | O | | | |
| | | | SEPIA | | | | | | | | | O | | |
| | | | MONOCHROME | | | | | | | | | | O | |
| | 3 | FILTER | FLESH COLOR | | O | | | | | | | | | |
| | | | BLUE EMPHASIS | | | O | | | | | | | | |
| | | | GREEN EMPHASIS | | | O | | | | | | | | |
| | 4 | STROBE MODE | AUTO | | | | | | | | | | | |
| | | | RED-EYE | | O | | | | | | | | | |
| | | | FORCIBLE FLASH | | | | | | | O | | | | |
| | | | FLASH PROHIBITION | | | | | | | | | | | |
| | | | SLOW SYNCH | | | | | | O | | | | | |
| | 5 | IMAGE QUALITY MODE | SHQ | O | | | | | | | | | | |
| | | | HQ | O | | | | | | | | | | |
| | | | SQ | O | | | | | | | | | | |
| | | | TIFF | | | | | | | | | | | |
| | | | RAW | | | | | | | | | | | |
| CONDITION FOR IMAGE CAPTURING | 6 | SCENE LUMINANCE | NORMAL | O | | | | | | | | | | |
| | | | HIGH LUMINANCE | | | | | | | | | | | |
| | | | LOW LUMINANCE | O | | | | | | | | | | |
| | | SUBJECT DISTANCE | MID-DISTANCE | | | | | | | | | | | |
| | | | LONG DISTANCE | | | O | | | | | | | | |
| | | | MACRO | | | | | | | | O | | | |
| | | SHUTTER SPEED | NORMAL | O | | | | | | | | | | |
| | | | HIGH SPEED | | | | O | | | | | | | |
| | | | LOW SPEED | | | | | | | | | | | |
| | 7 | APERTURE | NORMAL | O | | | | | | | | | | |
| | | | LARGE | O | | | | | | | | | | |
| | | | SMALL | O | | | | | | | | | | |
| | | STROBE | FLASH OFF | O | | | | | | | | | | |
| | | | FLASH ON | O | | | | | | | | | | |
| | | VIEW ANGLE | WIDE | O | | | | | | | | | | |
| | | | TELE | O | | | | | | | | | | |

FIG. 4B

| CORRECTION CONDITION CHANGE INFORMATION | CAMERA MODE SETTING | PRIORITY | ITEM | SETTING | BRIGHTNESS | CONTRAST | WHITE BALANCE | CHROMA | SHARPNESS |
|---|---|---|---|---|---|---|---|---|---|
| | | 1 | EXPOSURE MODE | AUTO | | | | | |
| | | | | APERTURE PRIORITY | | | | | |
| | | | | SHUTTER SPEED PRIORITY | | | | | |
| | | | | MANUAL | × | | | | |
| | | | PHOTOMETRY MODE | EVALUATIVE PHOTOMETRY | | | | | |
| | | | | CENTER-SPOT | | | | | |
| | | | | SPOT | × | | | | |
| | | | EXPOSURE CORRECTION | +1 STEP | × | | | | |
| | | | | NON-CORRECTION | | | | | |
| | | | | −1 STEP | × | | | | |
| | | | CONTRAST | NORMAL | | | | | |
| | | | | HIGH | | × | | | |
| | | | | LOW | | × | | | |
| | | | CHROMA | NORMAL | | | | | |
| | | | | HIGH | | | | × | |
| | | | | LOW | | | | × | |
| | | | WHITE BALANCE | AUTO | | | | | |
| | | | | DAYLIGHT | | | × | | |
| | | | | OVERCAST | | | × | | |
| | | | | FLUORESCENCE LIGHT | | | × | | |
| | | | | TUNGSTEN LIGHT | | | × | | |
| | | | SHARPNESS | NORMAL | | | | | |
| | | | | HIGH | | | | | × |
| | | | | LOW | | | | | × |
| | | | ISO SENSITIVITY | AUTO | | | | | |
| | | | | 100 | | | | | |
| | | | | 200 | | | | | |
| | | | | 400 | | | | | × |

| MODE | | HIGH-ORDER 4 BITS | | | | LOW-ORDER 5 BITS | | | | |
|---|---|---|---|---|---|---|---|---|---|---|
| CORRECTION MODE | STANDARD | 0 | 0 | 0 | 0 | | | | | |
| | PORTRAIT | 0 | 0 | 0 | 1 | | | | | |
| | LANDSCAPE | 0 | 0 | 1 | 0 | | | | | |
| | SPORTS | 0 | 0 | 1 | 1 | | | | | |
| | TWILIGHT SCENE | 0 | 1 | 0 | 0 | | | | | |
| | NIGHT SCENE | 0 | 1 | 0 | 1 | | | | | |
| | BACKLIGHT | 0 | 1 | 1 | 0 | | | | | |
| | MACRO | 0 | 1 | 1 | 1 | | | | | |
| | SEPIA | 1 | 0 | 0 | 0 | | | | | |
| | MONOCHROME | 1 | 0 | 0 | 1 | | | | | |
| | NON-CORRECTION | 1 | 0 | 1 | 0 | | | | | |
| CORRECTION CONDITION CHANGE | BRIGHTNESS | | | | | 1 | 0 | 0 | 0 | 0 |
| | CONTRAST | | | | | 0 | 1 | 0 | 0 | 0 |
| | WHITE BALANCE | | | | | 0 | 0 | 1 | 0 | 0 |
| | CHROMA | | | | | 0 | 0 | 0 | 1 | 0 |
| | SHARPNESS | | | | | 0 | 0 | 0 | 0 | 1 |

F I G. 5 A

| bit | 9 | 8 | 7 | 6 | 5 | 4 | 3 | 2 | 1 |
|---|---|---|---|---|---|---|---|---|---|
| data | 0 | 0 | 1 | 0 | 1 | 0 | 1 | 0 | 0 |

| | | | | | CORRECTION MODE | | | | | | | | |
|---|---|---|---|---|---|---|---|---|---|---|---|---|---|
| | | | | STAN-DARD | PORT-RAIT | LAND-SCAPE | SPORTS | TWILIGHT SCENE | NIGHT SCENE | BACK-LIGHT | MACRO | SEPIA | MONO-CHROME | NON-CORRECTION |
| CORRECTION MODE SELECTION INFORMATION | PRIO-RITY | ITEM | SETTING | | | | | | | | | | | |
| | 1 | MOVING IMAGE MODE | MOVING IMAGE | | | | | | | | | | | O |
| | | SCENE MODE | PORTRAIT | | O | | | | | | | | | |
| | | | SNAP | | O | | | | | | | | | |
| | 2 | | LANDSCAPE | | | O | | | | | | | | |
| | | | SPORTS | | | | O | | | | | | | |
| | | | TWILIGHT SCENE | | | | | O | | | | | | |
| | | | NIGHT SCENE | | | | | | O | | | | | |
| | | | MACRO | | | | | | | | O | | | |
| | | FILTER | SEPIA | | | | | | | | | O | | |
| | 3 | | MONOCHROME | | | | | | | | | | O | |
| | | | FLESH COLOR | | O | | | | | | | | | |
| | | | BLUE EMPHASIS | | | O | | | | | | | | |
| | | | GREEN EMPHASIS | | | O | | | | | | | | |
| | | STROBE MODE | AUTO | | O | | | | | | | | | |
| | 4 | | RED-EYE | | | | | | | | | | | |
| | | | FORCIBLE FLASH | | | | | | | O | | | | |
| | | | FLASH PROHIBITION | | | | | | | | | | | |
| | | | SLOW SYNCH | | | | | | O | | | | | |
| | | SCENE LUMINANCE | NORMAL | O | | | | | | | | | | |
| | | | HIGH LUMINANCE | O | | | | | | | | | | |
| | | SUBJECT DISTANCE | LOW LUMINANCE | | | | | | O | | | | | |
| | 5 | | MID-DISTANCE | O | | | | | | | | | | |
| | | | LONG DISTANCE | | | O | | | | | | | | |
| | | | MACRO | | | | | | | | O | | | |
| | | SHUTTER SPEED | NORMAL | O | | | | | | | | | | |
| | | | HIGH SPEED | | | | O | | | | | | | |
| | | | LOW SPEED | O | | | | | | | | | | |
| | 6 | APERTURE | NORMAL | O | | | | | | | | | | |
| | | | LARGE | O | | | | | | | | | | |
| | | | SMALL | O | | | | | | | | | | |
| | | STROBE | FLASH OFF | O | | | | | | | | | | |
| | | | FLASH ON | O | | | | | | | | | | |
| | | VIEW ANGLE | NORMAL | O | | | | | | | | | | |
| | | | WIDE | O | | | | | | | | | | |
| | | | TELE | O | | | | | | | | | | |

SHOOTING MODE SETTING: rows for priority 1–4
SHOOTING CONDITION: rows for priority 5–6

FIG. 8B

| | | | Correction Condition Change | | | | | |
|---|---|---|---|---|---|---|---|---|
| | | | | Brightness | Contrast | White Balance | Chroma | Sharpness |
| | Priority | Item | Setting | | | | | |
| Correction Condition Change Information | Shooting Mode Setting | | Exposure Mode | Auto | | | | | |
| | | | | Aperture Priority | | | | | |
| | | | | Shutter Speed Priority | | | | | |
| | | | | Manual | × | | | | |
| | | 1 | Photometry Mode | Evaluative Photometry | | | | | |
| | | | | Center-Spot | | | | | |
| | | | | Spot | × | | | | |
| | | | Exposure Correction | +1 Step | × | | | | |
| | | | | Non-Correction | | | | | |
| | | | | −1 Step | × | | | | |
| | | | Contrast | Normal | | | | | |
| | | | | High | | × | | | |
| | | | | Low | | × | | | |
| | | | Chroma | Normal | | | | | |
| | | | | High | | | | × | |
| | | | | Low | | | | × | |
| | | | White Balance | Auto | | | | | |
| | | | | Daylight | | | × | | |
| | | | | Overcast | | | × | | |
| | | | | Fluorescence Light | | | × | | |
| | | | | Tungsten Light | | | × | | |
| | | | Sharpness | Normal | | | | | |
| | | | | High | | | | | × |
| | | | | Low | | | | | × |
| | | | ISO Sensitivity | Auto | | | | | |
| | | | | 100 | | | | | |
| | | | | 200 | | | | | |
| | | | | 400 | | | | | × |

IMAGE FILE STRUCTURE (WITH PRINT CORRECTION INFORMATION)

| FILE IDENTIFIER | FIXED VALUE | "OLRF" | 2 byte |
|---|---|---|---|
| IMAGE SIZE | WIDTH | 1600 | 2 byte |
| | HEIGHT | 1200 | 2 byte |
| PRINT CORRECTION IDENTIFIER | FIXED VALUE | "OLPP" | 2 byte |
| PRINT CORRECTION INFORMATION | CORRECTION MODE | 84 | 1 byte |
| IMAGE DATA | JPEG COMPRESSION DATA | | DEPENDENT ON IMAGE DATA |

F I G. 1 0 A

IMAGE FILE STRUCTURE (WITHOUT PRINT CORRECTION INFORMATION)

| FILE IDENTIFIER | FIXED VALUE | "OLRF" | 4 byte |
|---|---|---|---|
| IMAGE SIZE | WIDTH | 1600 | 2 byte |
| | HEIGHT | 1200 | 2 byte |
| IMAGE DATA | JPEG COMPRESSION DATA | | DEPENDENT ON IMAGE DATA |

F I G. 1 0 B

| ITEM | SETTING | IMAGE PROCESS PARAMETER | PRINT CORRECTION VALUE |
|---|---|---|---|
| CONTRAST | NORMAL | 0 | 50 |
| | HIGH | 1 | 70 |
| | LOW | 2 | 30 |
| CHROMA | NORMAL | 0 | 50 |
| | HIGH | 1 | 70 |
| | LOW | 2 | 30 |
| WHITE BALANCE | NORMAL | 0 | 50 |
| | HIGH | 1 | 70 |
| | LOW | 2 | 30 |
| SHARPNESS | NORMAL | 0 | 50 |
| | HIGH | 1 | 70 |
| | LOW | 2 | 30 |

F I G. 1 3

IMAGE FILE STRUCTURE (WITHOUT PRINT CORRECTION INFORMATION)

| FILE IDENTIFIER | FIXED VALUE | "OLRF" | 4 byte |
|---|---|---|---|
| IMAGE SIZE | WIDTH | 1600 | 2 byte |
| | HEIGHT | 1200 | 2 byte |
| IMAGE DATA | JPEG COMPRESSION DATA | | DEPENDENT ON IMAGE DATA |

F I G. 1 6 A

IMAGE FILE STRUCTURE (WITH PRINT CORRECTION INFORMATION)

| FILE IDENTIFIER | FIXED VALUE | "OLRF" | 2 byte |
|---|---|---|---|
| IMAGE SIZE | WIDTH | 1600 | 2 byte |
| | HEIGHT | 1200 | 2 byte |
| PRINT CORRECTION IDENTIFIER | FIXED VALUE | "OLPP" | 2 byte |
| PRINT CORRECTION INFORMATION | CORRECTION MODE | 0 (STANDARD) | 1 byte |
| | CONTRAST | 70 | 1 byte |
| | CHROMA | 70 | 1 byte |
| | WHITE BALANCE | 50 | 1 byte |
| | SHARPNESS | 30 | 1 byte |
| IMAGE DATA | JPEG COMPRESSION DATA | | DEPENDENT ON IMAGE DATA |

F I G. 1 6 B

PRINT CORRECTION INFORMATION (CORRECTION MODE)

| MODE | | 4 bit | | | |
|---|---|---|---|---|---|
| CORRECTION MODE | STANDARD | 0 | 0 | 0 | 0 |
| | PORTRAIT | 0 | 0 | 0 | 1 |
| | LANDSCAPE | 0 | 0 | 1 | 0 |
| | SPORTS | 0 | 0 | 1 | 1 |
| | TWILIGHT SCENE | 0 | 1 | 0 | 0 |
| | NIGHT SCENE | 0 | 1 | 0 | 1 |
| | BACKLIGHT | 0 | 1 | 1 | 0 |
| | MACRO | 0 | 1 | 1 | 1 |
| | SEPIA | 1 | 0 | 0 | 0 |
| | MONOCHROME | 1 | 0 | 0 | 1 |
| | NON-CORRECTION | 1 | 0 | 1 | 0 |

FIG. 17

IMAGE CAPTURING DEVICE USING CORRECTION INFORMATION FOR PREVENTING AT LEAST A PART OF CORRECTION PROCESS FROM BEING PERFORMED WHEN IMAGE DATA IS CORRECTED AT AN EXTERNAL DEVICE

BACKGROUND OF THE INVENTION

1. Field of the Invention

The present invention relates to a technique applied to an electronic camera, an image forming apparatus, a storage medium, an electronic camera system, etc.

2. Description of the Related Art

In recent years, there has been a growth in the number of cases where an image is appreciated by making a printer (image forming apparatus) print the image shot with an electronic camera, or by making a display of a TV (television), a PC (Personal Computer), etc. show the image.

On the basis of such a background, for example, a printer is equipped with various functions to print a more suitable image. The functions include an automatic correction function. This is a function for analyzing image data to be printed, and for performing an image process for a correction based on a result of the analysis. Normally, the image process for a correction is performed to satisfy a uniform condition (standard image condition) that is preset for a printer. Accordingly, the image process for a correction is performed to satisfy the uniform condition for whichever image data, so that a standard image expected to be normally appropriate is printed.

However, with this function, the above described image process for a correction is performed to satisfy the uniform condition even for an image that a user shoots by changing shooting conditions, etc. to intentionally make the image nonstandard. Therefore, an image different from the original shooting intention of a user is printed. For example, if a user prints an image that the user intentionally underexposes at the time of shooting, an extra image process for an exposure correction is performed according to the uniform condition, so that a printing result differs from that of the shooting intention of the user.

In consequence, a variety of techniques for preventing such a problem are proposed.

By way of example, Japanese Patent Publication No. 10-200671 proposes a technique with which finish information is obtained for each image data to be printed, an image process is performed based on the finish information, and the image data for which the image process is performed is printed. As the finish information, information that an operator inputs at the time of printing is obtained. Or, for a camera of an APS (advanced photo system), finish information is obtained, for example, by reading a code (finish information) that a user inputs at the time of shooting, and is recorded on the magnetic track of a film.

Additionally, Japanese Patent Publication No. 11-239269 proposes a technique with which scene information is obtained for each image data to be printed, an image process is performed based on the scene information, and image data for which the image process is performed is printed. By way of example, for a camera of an APS (advanced photo system), scene information is input by a user via a magnetic information input means arranged in the camera, and obtained, for example, by reading information in each frame of a film, which is magnetically recorded on a magnetic recording medium.

All of these proposed techniques perform an image process in consideration of not only an analysis result of image data, but also finish information, scene information, etc., which are input by a user or an operator. Therefore, these techniques are effective in preventing the above described problem.

With these techniques, however, finish information, scene information, etc. must be input at the time of each shooting or printing, leading to an increase in a user load. Namely, a user must input a code that represents finish information, scene information, etc. at the time of each shooting. Or, the user must remember finish information, scene information, etc. for each frame to be shot, and must instruct an operator of the information along with a frame at the time of printing. As a result, troublesome operations for inputting finish information, scene information, etc. are required from the shooting to the printing.

In the meantime, for example, Japanese Patent Publication No. 10-226139 proposes a technique for determining a printing process based on supplementary information (resolution information, color mode information, aperture, shutter speed, etc. at the time of shooting) of an image to be printed, information specific to a camera (such as camera type information, etc.), the state of a printer or information specific to the printer (a head type, an ink type, etc.), and mode information (print speed, print quality, etc.) set by a user, and for printing an image with the determined printing process.

This technique is a proposal that enables an appropriate image to be printed by determining a suitable printing process based on the supplementary information, etc. of image information even for the image information stored in a data format suitable for any host, and prevents an unsuitable printing process from being performed due to a difference in the data format of stored image information.

However, this proposed technique is not intended to prevent an image that does not conform to the shooting intention of a user from being printed at the time of printing. Therefore, even if a user attempts to print an image that he or she shoots by changing shooting conditions, etc. so as to intentionally make the image nonstandard, the shooting intention of the user cannot be accurately reflected.

As described above, no techniques for accurately reflecting the shooting intention of a user at the time of printing (at the time of image forming) without performing troublesome operations such as an input operation, etc. were conventionally proposed.

Additionally, some printers comprise a function with which a user can freely set printing modes (portrait mode, sports mode, etc.) in which a predetermined image process is performed for image data (shot image), which is then printed, so as to enable image printing according to higher user preferences.

Furthermore, some PC applications include a function with which a user can freely make image process settings such as the contrast, the chroma, etc. of an image to be shot in order to enable image creation (image display, image printing, etc.) according to higher user preferences.

Such printers or PC applications enable the printing, the display, etc. of a shot image according to higher user preferences. However, a user must make troublesome settings such as a printing mode setting, an image process setting, etc. for an image forming instruction, which leads to an increase in a user load.

Incidentally, some electronic cameras perform a process based on predetermined information that is prerecorded on a recording medium.

For example, Japanese Patent Publication No. 3-268583 proposes an electronic still camera that performs a function control based on program data stored on a recording medium. With this proposed technique, the program data read from the recording medium is stored in a storing unit, and thereafter, a predetermined function can be implemented based on the program data stored in the storing unit.

Additionally, Japanese Patent Publication No. 9-130731 proposes an electronic still camera that implements various functions based on a setting file prestored on a recording medium. This proposed technique can implement, for example, a function for compressing image data, based on the contents (an instruction of a file format, a specification of a compression ratio, etc.) of the setting file read from the recording medium.

However, the above described proposal recited by Japanese Patent Publication No. 3-268583 is intended not to eliminate the user load of making the above described troublesome settings for an image forming instruction, but to make the electronic camera implement a predetermined function. Additionally, the amount of program data, which is stored on a recording medium in order to implement a predetermined function, becomes large with an increase in the number of functions, and occupies more of the space of the recording medium, and can possibly restrict the original role of recording image data. Furthermore, the proposal recited by Japanese Patent Publication No. 9-130731 is intended not to eliminate the user load of making the above described troublesome settings for an image forming instruction, but to facilitate the settings of an electronic camera, such as a file format, a compression ratio, etc.

Furthermore, some electronic cameras are equipped with a function for enabling the various settings of image processes performed in a shooting process. With this function, a user can freely change the settings of each of the image processes, such as white balance, chroma, etc., so that a shot image according to higher preferences can be obtained.

However, if the number of settings becomes large due to the equipment of such a function, a user can make fine settings, but a heavier load of making the settings is imposed on the user, and the operability of an electronic camera is degraded.

SUMMARY OF THE INVENTION

The present invention was developed to overcome the above described problems. A first object of the present invention is to accurately reflect the shooting intention of a user when a visible image is formed, without imposing a load on the user. A second object of the present invention is to eliminate the user load of making the settings of an image forming instruction, such as printing, display, etc. of a shot image, when a visible image is formed. A third object of the present invention is to reduce a user load of making the settings of an electronic camera without restricting the original role of a recording medium.

An electronic camera, which is a first preferred embodiment of the present invention, is configured to comprise: an image capturing unit capturing an image of a subject, and outputting an image signal; an image processing unit obtaining image data in a predetermined format based on the image signal captured by the image capturing unit; a setting unit setting an image capturing condition for capturing the image of the subject; a storing unit storing a plurality of pieces of image forming instruction information when a visible image is formed based on the image data; a selecting unit selecting a predetermined piece of image forming instruction information from among the plurality of pieces of image forming instruction information stored in the storing unit, based on the image capturing condition set by the setting unit; and an outputting unit associating the image forming instruction information selected by the selecting unit with the image data, and outputting the image forming instruction information in association with the image data.

With the above described configuration, image forming instruction information when a visible image is formed based on image data is selected according to an image capturing condition for capturing an image of a subject. As a result, a particular input operation, instruction, etc. for reflecting a shooting intention becomes unnecessary, and a user only performs a normal shooting operation (camera operation), whereby the shooting intention of the user can be accurately reflected when a visible image is formed. Note that the shooting condition is a shooting mode that a user sets at the time of shooting, or a condition for image capturing, which is used at the time of image capturing, etc.

Furthermore, the image forming instruction information is information for specifying a process performed when a visible image is formed, and is, for example, information for specifying a correction mode indicating a correction process performed when a visible image is formed.

An electronic camera system, which is a second preferred embodiment of the present invention, is an electronic camera system comprising an electronic camera, and an image forming apparatus. The electronic camera comprises: an image capturing unit capturing an image of a subject, and outputting an image signal; an image processing unit obtaining image data in a predetermined format based on the image signal captured by the image capturing unit; a setting unit setting an image capturing condition for capturing the image of the subject; a storing unit storing a plurality of pieces of image forming instruction information when a visible image is formed based on the image data; a selecting unit selecting a predetermined piece of image forming instruction information from among the plurality of pieces of image forming instruction information stored in the storing unit; and an outputting unit associating the image forming instruction information selected by the selecting unit with the image data, and outputting the image forming instruction information in association with the image data. The image forming apparatus comprises: a reading unit reading image data to be formed as an image, and image forming instruction information in association with the image data; an image forming mode selecting unit selecting an image forming mode which corresponds to the image forming instruction information read by the reading unit from among a plurality of image forming modes in each of which an image forming process is performed according to a different condition; an image forming processing unit performing an image quality forming process according to the image forming mode which is selected by the image forming mode selecting unit; and an image outputting unit outputting the image data for which the image process is performed by the image forming processing unit.

With the above described configuration, in the image forming apparatus, when image data output from the electronic camera and image forming instruction information in association with the image data are read, an image forming mode corresponding to the image forming instruction information is selected, and an image forming process according to the image forming mode is performed for the image data. This eliminates the need for a particular input operation, instruction, etc., which are intended to reflect shooting intention, and a user simply performs a normal shooting operation (camera operation), so that his or her shooting intention can be accurately reflected when a visible image is formed. Notice that the image forming mode is, for example, a correction mode, etc., which indicates a correction process performed when a visible image is formed.

An electronic camera, which is a third preferred embodiment of the present invention, is configured to comprise: an image capturing unit capturing an image of a subject, and outputting an image signal; an image processing unit obtaining image data in a predetermined format based on the image signal captured by the image capturing unit; a shooting condition correcting unit correcting a shooting condition for exposure or image quality at the time of shooting; a setting unit setting correction instruction information for instructing a correction for a process performed when a visible image is formed from the image data, according to the shooting condition corrected by the shooting condition correcting unit; and an outputting unit associating the correction instruction information for instructing a correction for a process performed when the process for forming a visible image, which is set by the setting unit, with the image data and outputting the correction instruction information in association with the image data.

With the above described configuration, correction instruction information for instructing a correction for a process performed when a visible image is formed from image data is set based on a shooting condition (a shooting condition for exposure or image quality) that a user corrects at the time of shooting, whereby the shooting intention of the user can be accurately reflected when a visible image is formed. Note that the shooting condition for exposure or image quality is, for example, a camera mode, etc. Furthermore, the correction instruction information is, for instance, information indicating whether or not to make a correction for each of processes for brightness, contrast, white balance, chroma, sharpness, etc.

An electronic camera system, which is a fourth preferred embodiment of the present invention, is an electronic camera system comprising an electronic camera and an image forming apparatus. The electronic camera comprises: an image capturing unit capturing an image of a subject, and outputting an image signal; an image processing unit obtaining image data in a predetermined format based on the image signal captured by the image capturing unit; a shooting condition correcting unit correcting a shooting condition for exposure or image quality at the time of shooting; a setting unit setting correction instruction information for instructing a correction for a process performed when a visible image is formed from the image data, according to the shooting condition corrected by the shooting condition correcting unit; and an outputting unit associating the correction instruction information for instructing a correction for a process performed when a visible image is formed, which is set by the setting unit, with the image data, and outputting the correction instruction information in association with the image data. The image forming apparatus comprises: a reading unit reading image data to be formed as an image, and correction instruction information in association with the image data; an image forming processing unit performing an image quality forming process based on the correction instruction information read by the reading unit; and an outputting unit outputting the image data for which the image process is performed by the image forming processing unit.

With the above described configuration, in the image forming apparatus, a correction for a process performed when a visible image is formed is made based on correction instruction information, when image data and the correction instruction information in association with the image data output from the electronic camera are read, and the visible image is formed from the image data. This correction instruction information is set based on a shooting condition (a shooting condition for exposure or image quality) that a user corrects at the time of shooting, whereby the shooting intention of the user can be accurately reflected when a visible image is formed.

An electronic camera, which is a fifth preferred embodiment of the present invention, is an electronic camera comprising a recording unit which attaches supplementary information to image data obtained by shooting, and records the image data with the supplementary information attached on a recording medium as one image file. The electronic camera is configured to further comprise a parameter reading unit reading a parameter for an image forming instruction, which is prerecorded on the recording medium. The recording unit includes the parameter for the image forming instruction, which is read by the parameter reading unit, in the supplementary information, and records the supplementary information including the parameter. As a result, an image is formed based on the parameter for the image forming instruction, which is included in the supplementary information.

With the above described configuration, a parameter for an image forming instruction, which is prerecorded on a recording medium, is included in the supplementary information of an image file, whereby it becomes possible to make, for example, a printer or an application of a PC, which forms an image based on an image file including the supplementary information, form an image based on the parameter for the image forming instruction. Accordingly, the user load of making the settings of an image forming instruction when a visible image is formed can be eliminated.

An image forming apparatus, which is a sixth preferred embodiment of the present invention, is an image forming apparatus forming an image based on an image file including image data and supplementary information, and configured to form an image based on a parameter for an image forming instruction, which is included in the supplementary information and prerecorded on a recording medium.

With the above described configuration, an image is formed based on a parameter for an image forming instruction, which is included in supplementary information within an image file, thereby eliminating the user load of making the settings of an image forming instruction when a visible image is formed.

A recording medium, which is a seventh preferred embodiment of the present invention, is a recording medium recording a parameter for an image forming instruction when a visible image is formed based on image data.

With the above described configuration, it is possible to make, for example, an image forming apparatus, etc., read the parameter for the image forming instruction recorded on the recording medium, whereby the image forming apparatus can form an image based on the parameter for the image forming instruction. Accordingly, the user load of making the settings of an image forming instruction when a visible image is formed can be eliminated.

An electronic camera system, which is an eighth preferred embodiment of the present invention, is an electronic camera system comprising: an electronic camera having a recording unit which attaches supplementary information to image data obtained by shooting, and records the image data with the supplementary information attached on a recording medium as one image file; and an image forming apparatus forming an image based on the image file. The electronic camera further comprises a parameter reading unit reading a parameter for an image forming instruction, which is prerecorded on the recording medium. The recording unit includes the parameter for the image forming instruction, which is read by the parameter reading unit, in the supplementary information, and records the supplementary information including the parameter. The image forming apparatus forms an image based on the parameter for the image forming instruction, which is included in the supplementary information within the image file.

With the above described configuration, in the image forming apparatus, an image is formed based on a parameter for an image forming instruction, which is read from a recording medium by the electronic camera and included in supplementary information, thereby eliminating the user load of making the settings of an image forming instruction when a visible image is formed.

An electronic camera, which is a ninth preferred embodiment of the present invention, is configured to comprise: a parameter reading unit reading a parameter for an image process setting, which is prerecorded on a recording medium; an image processing unit performing an image process for digital image data obtained by shooting; and a recording unit recording on the recording medium output image data of the image processing unit or image data based on the output image data.

With the above described configuration, an image process can be performed, by way of example, for image data obtained by shooting based on a parameter for an image process setting, which is prerecorded on a recording medium, thereby eliminating the user load of making the settings of an image process of the electronic camera.

An electronic camera, which is a tenth preferred embodiment of the present invention, is an electronic camera comprising a recording unit which attaches supplementary information to image data obtained by shooting, and records the image data with the supplementary information attached on a recording medium. The electronic camera comprises: a parameter reading unit reading a parameter for an image process setting, which is prerecorded on the recording medium; and a storing unit storing a plurality of pieces of image forming instruction information when a visible image is formed based on the image data.

With the above described configuration, a predetermined piece of image forming instruction information is selected, for example, from among a plurality of pieces of image forming instruction information based on a parameter for an image process setting, which is prerecorded on a recording medium, thereby eliminating the user load of making the settings of an image forming instruction.

A recording medium, which is an eleventh preferred embodiment of the present invention, is a recording medium recording a parameter for an image process setting, which is used at least when an electronic camera performs an image process or obtains image forming instruction information.

With the above described configuration, the electronic camera in which this recording medium is inserted can perform an image process based on a parameter for an image process setting, which is prerecorded on the recording medium, and can obtain image forming instruction information based on the parameter for the image process setting. Additionally, the amount of data of recorded parameters for image process settings is not so large as that of program data. Therefore, there is no fear of restricting the original role of recording image data, which the recording medium plays.

An electronic camera system, which is a twelfth preferred embodiment of the present invention, is an electronic camera system comprising: an electronic camera having a recording unit which attaches supplementary information to image data obtained by shooting, and records the image data with the supplementary information attached on a recording medium; and an image forming apparatus forming a visible image based on the image data with the supplementary information attached. The electronic camera comprises: a parameter reading unit reading a parameter for an image process setting, which is prerecorded on the recording medium; a storing unit storing a plurality of pieces of image forming instruction information when the image forming apparatus forms a visible image based on the image data; and an instruction information selecting unit selecting a predetermined piece of image forming instruction information from among the plurality of pieces of image forming instruction information stored in the storing unit based on the parameter for the image process setting, which is read by the parameter reading unit. The recording unit includes the image forming instruction information selected by the instruction information selecting unit in the supplementary information, and records the supplementary information including the image forming instruction information. The image forming apparatus forms a visible image based on the image forming instruction information included in the supplementary information.

With the above described configuration, in the image forming apparatus, a visible image is formed based on predetermined image forming instruction information that the electronic camera selects based on a parameter for an image process setting, which is prerecorded on a recording medium, thereby eliminating the user load of making the settings of an image forming instruction when the visible image is formed.

BRIEF DESCRIPTION OF THE DRAWINGS

FIG. 4A shows a correction mode selection table;

FIG. 4B shows a correction condition change table;

FIG. 5A explains the data structure of print correction information;

FIG. 5B exemplifies the data structure of print correction information;

FIG. 8A exemplifies the correction mode selection table stored in a ROM of an electronic camera according to the second preferred embodiment;

FIG. 8B exemplifies the correction condition change table stored in the ROM of the electronic camera according to the second preferred embodiment;

FIG. 10A exemplifies the structure of an image file recorded by the shooting process shown in FIG. 9;

FIG. 10B exemplifies the structure of an image file recorded by a normal shooting process (not shown);

FIG. 13 shows a print correction value selection table;

FIG. 16A shows the structure of an image file recorded by the shooting process shown in FIG. 14;

FIG. 16B shows the structure of an image file recorded by the shooting process shown in FIG. 15;

FIG. 17 exemplifies a data table of a correction mode; and

DESCRIPTION OF THE PREFERRED EMBODIMENTS

Hereinafter, preferred embodiments according to the present invention are described with reference to the drawings.

First of all, the first preferred embodiment of the present invention is described.

Note that a shooting mode and a condition for image capturing indicate an image capturing condition, a correction mode indicates image forming instruction information or an image forming instruction mode, a camera mode indicates a shooting condition for exposure or image quality, and a correction condition indicates correction instruction information, in the first preferred embodiment.

Figure 1:
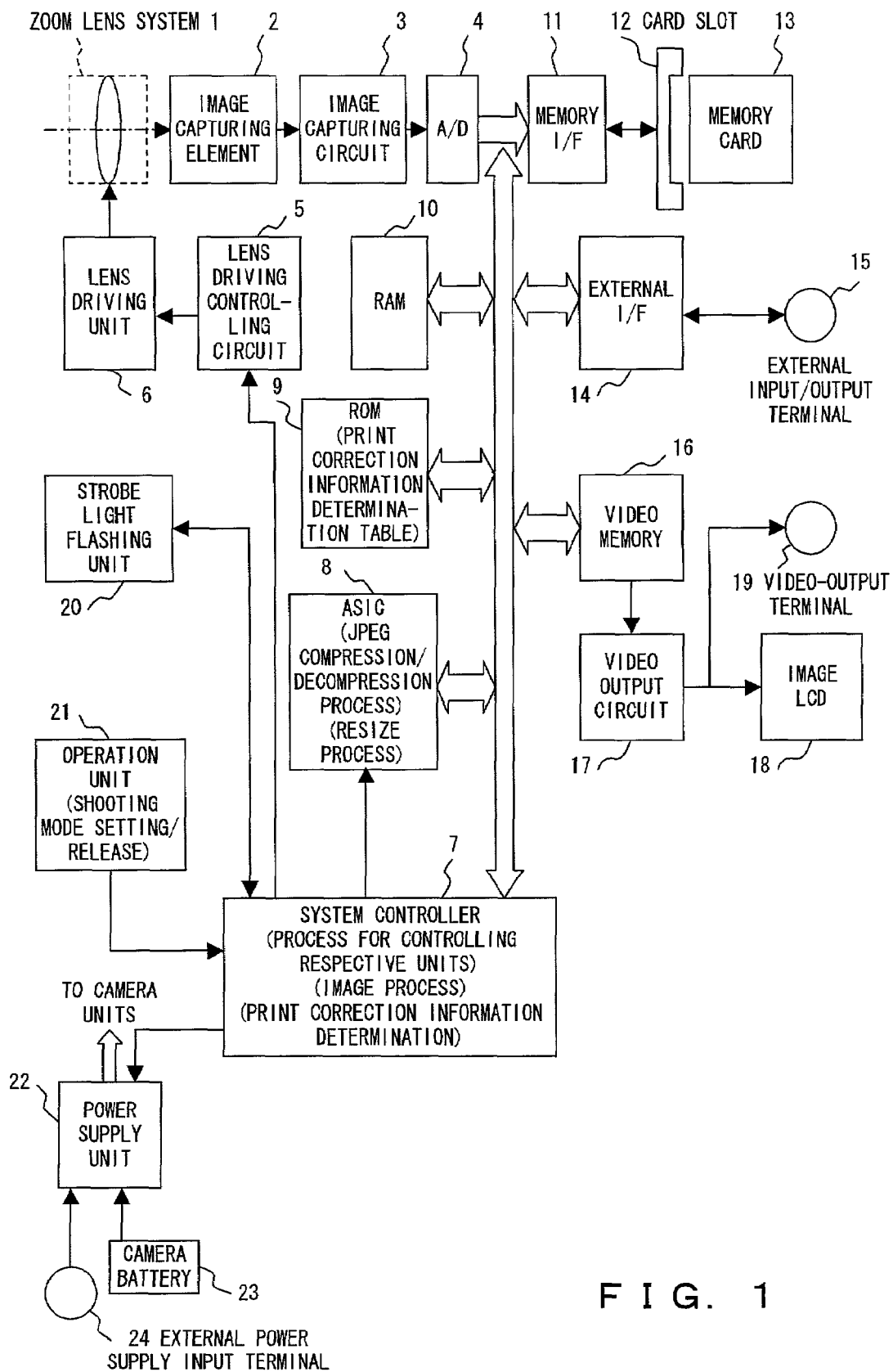
FIG. 1 is a block diagram showing the configuration of an electronic camera according to a first preferred embodiment.
Figure 2:
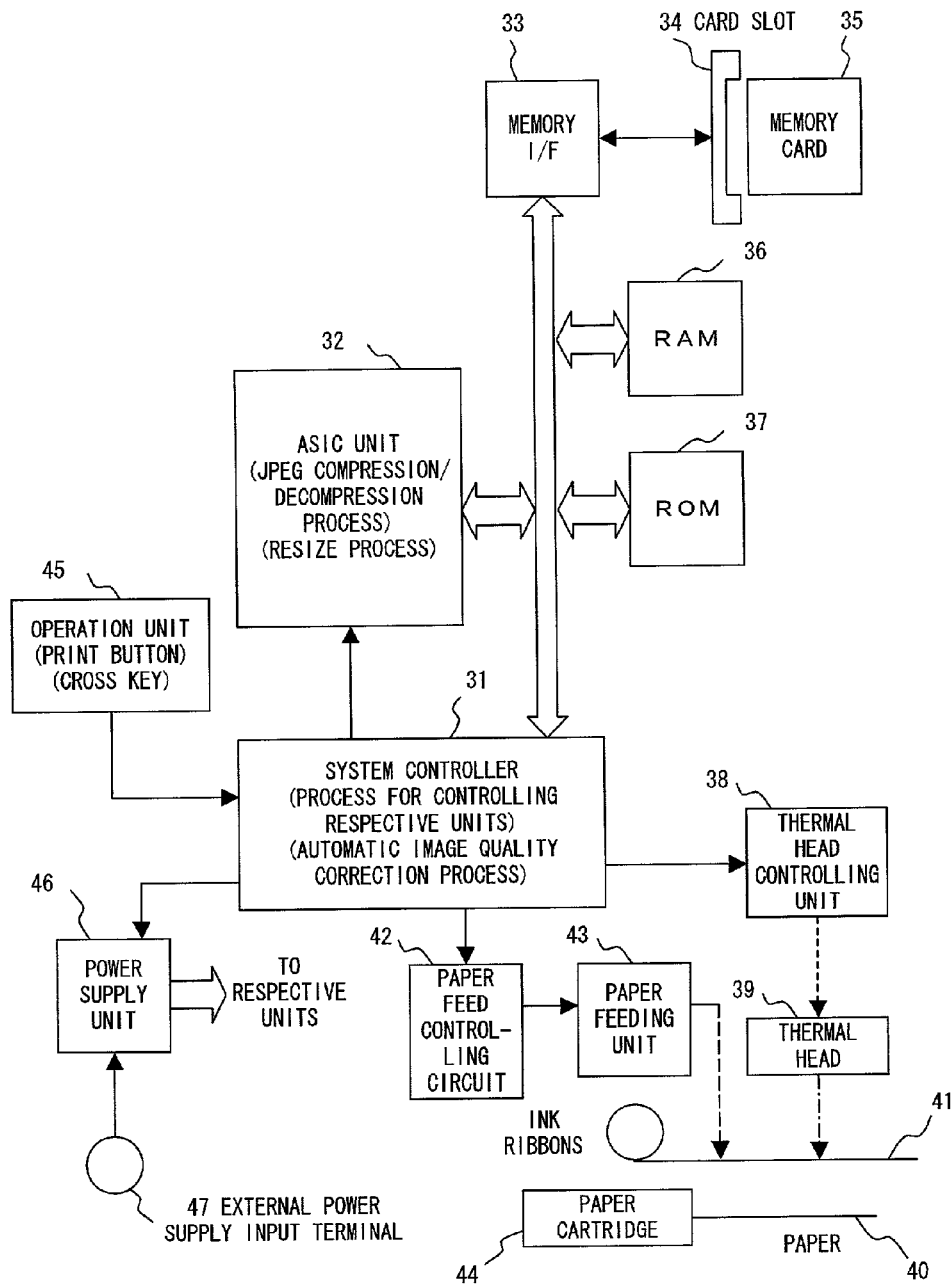
FIG. 2 is a block diagram showing the configuration of a printer according to the first preferred embodiment.

FIG. 1 is a block diagram showing the configuration of an electronic camera included in an electronic camera system according to the first preferred embodiment. The electronic camera shown in this figure comprises a function for enabling shooting based on a shooting mode or a camera mode, which is set by a user (a person who shoots an image). FIG. 2 is a block diagram showing the configuration of a printer (image forming apparatus) included in the electronic camera system according to the first preferred embodiment. The printer shown in this figure comprises a function for enabling printing based on an instructed correction mode.

Configuration of the electronic camera is first described with reference to FIG. 1.

In this figure, a zoom lens system 1, an image capturing element 2, an image capturing circuit 3, and an A/D (analog/digital) conversion circuit 4 configure an image capturing unit. In the image capturing unit, a subject the optical image of which is produced by the zoom lens system 1 is optoelectrically converted by the image capturing element 2. When an image signal being a conversion output is input to the A/D conversion circuit 4 via the image capturing circuit 3, it is analog-to-digital converted, so that image data being digital data is obtained. Here, a lens comprised by the zoom lens system 1 is driven by a lens driving unit 6 that is controlled by a lens driving controlling circuit 5, and the focus of a subject image is adjusted.

A system controller 7 is configured by comprising a CPU (Central Processing Unit). The system controller 7 controls respective units configuring the electronic camera, and performs image processes for correcting the contrast, the chroma, the hue, etc. of an image indicated by image data. The system controller 7 also performs processes, which will be described in detail later, such as a process for selecting a correction mode based on a shooting mode or a condition for image capturing, a process for selecting a correction condition based on a camera mode, and the like.

An ASIC (Application Specific Integrated Circuit) unit 8 performs a process for compressing/decompressing image data with a JPEG (Joint Photographic Experts Group) method, a process for resizing image data, and the like.

A ROM 9 is a read-only memory storing a control program for making the CPU comprised by the system controller 7 control the respective units configuring the electronic camera, computation data required for the processes, a correction mode selection table and a correction condition change table, which will be described later, and the like. In this figure, the correction mode selection table and the correction condition change table are collectively shown as a print correction information determination table.

A RAM 10 is a random access memory that is used as a buffer memory for temporarily storing image data, or also used as a working space for the processes performed by the system controller 7.

A memory I/F (interface) 11 is intended to provide an interface function for exchanging data with a memory card 13 that is inserted into a card slot 12. Via the memory I/F 11, operations such as a write of an image file (including image data) to the memory card 13 that is configured by comprising a semiconductor memory, a read of an image file (including image data) from the memory card 13, and the like are performed.

An external I/F (interface) 14 is intended to provide an interface function for exchanging data with an external device that is connected to an external input/output terminal 15, for example, a PC (Personal Computer), etc. Via the external I/F 14, an output of an image file (including image data), data of various types, etc. to the external device, or an input of an image file (including image data), data of various types, etc. from the external device is made.

A video memory 16 is a memory for temporarily storing image data for display, which is obtained by an image process performed by the system controller 7. This image data is read from the video memory 16, input to a video output circuit 17, and converted into an image signal which is a video signal. When the image signal is input to an image LCD 18, the image is displayed. Furthermore, this image signal can be transmitted to another device via a video-out terminal 19.

A strobe light flashing unit 20 is intended to flash a strobe light when shooting is made with a strobe.

An operation unit 21 is buttons of various types (including a release button), switches or the like for accepting instructions such as a shooting mode instruction, a camera mode instruction, a shooting instruction, etc. The operation unit 21 is intended to notify the system controller 7 of an accepted instruction.

A power supply unit 22 supplies power to the respective units of the electronic camera by controlling the voltage of a camera battery 23, or the voltage of power input to an external power supply terminal 24.

Configuration of the printer is next described with reference to FIG. 2. The printer shown in this figure is a printer of a sublimation dyetransfer printing type, which uses ink ribbons of, for example, Y (Yellow), M (Magenta), and C (Cyan), and prints on paper with a frame sequential method.

In this figure, a system controller 31 is configured by comprising a CPU (Central Processing Unit). The system controller 31 controls the respective units configuring the printer, and performs various image processes for correcting the contrast, the chroma, the hue, etc. of an image based on image data (an automatic image quality correction process, etc.). The automatic image quality correction process will be described later.

An ASIC unit 32 performs a process for compressing/decompressing image data with a JPEG method, a process for resizing image data, etc.

A memory I/F 33 is intended to provide an interface function for exchanging data with a memory card 35 that is inserted into a card slot 34. Via the memory I/F 33, operations such as a write of an image file (including image data) to the memory card 35 that is configured by comprising a semiconductor memory to/from which data can be written/read, a read of an image file (including image data) from the memory card 35, and the like are performed.

A RAM 36 is a random access memory that is used as a buffer memory for temporarily storing image data, and also used as a working space for the processes performed by the system controller 31.

A ROM 37 is a read-only memory storing a control program for making a CPU comprised by the system controller 31 control the respective units configuring the printer, computation data required for various processes, and the like.

A thermal head controlling unit 38 reads image data for printing, which is obtained by the image processes such as the automatic image quality correction process, etc. performed by the system controller 31, in units of one line data, and drives (heats) a thermal head 39, so that a dye of an ink ribbon 41 is made to sublime, paper 40 is made to absorb the dye, and the image data is printed on the paper 40.

A paper feed controlling circuit 42 controls a paper feed unit 43, which feeds the paper 40 from a paper cartridge 44 when the respective inks are sequentially applied to overprint on the paper 40 with the ink ribbons of Y, M and C.

An operation unit 45 is buttons of various types, switches, etc. for accepting instructions such as an image selection instruction, a print instruction, etc. from a user, and is intended to notify the system controller 31 of an accepted instruction. Examples of the operation unit 45 include a power supply switch, a print button, a cross key, etc.

A power supply unit 46 supplies power to the respective units configuring the printer by controlling the voltage of power input to an external power supply terminal 47.

Processes of the electronic camera system including the electronic camera and the printer, which have the above described configurations, are described next. For the first preferred embodiment, processes until an image which is shot by the electronic camera is printed by the printer are mainly described.

Figure 3:
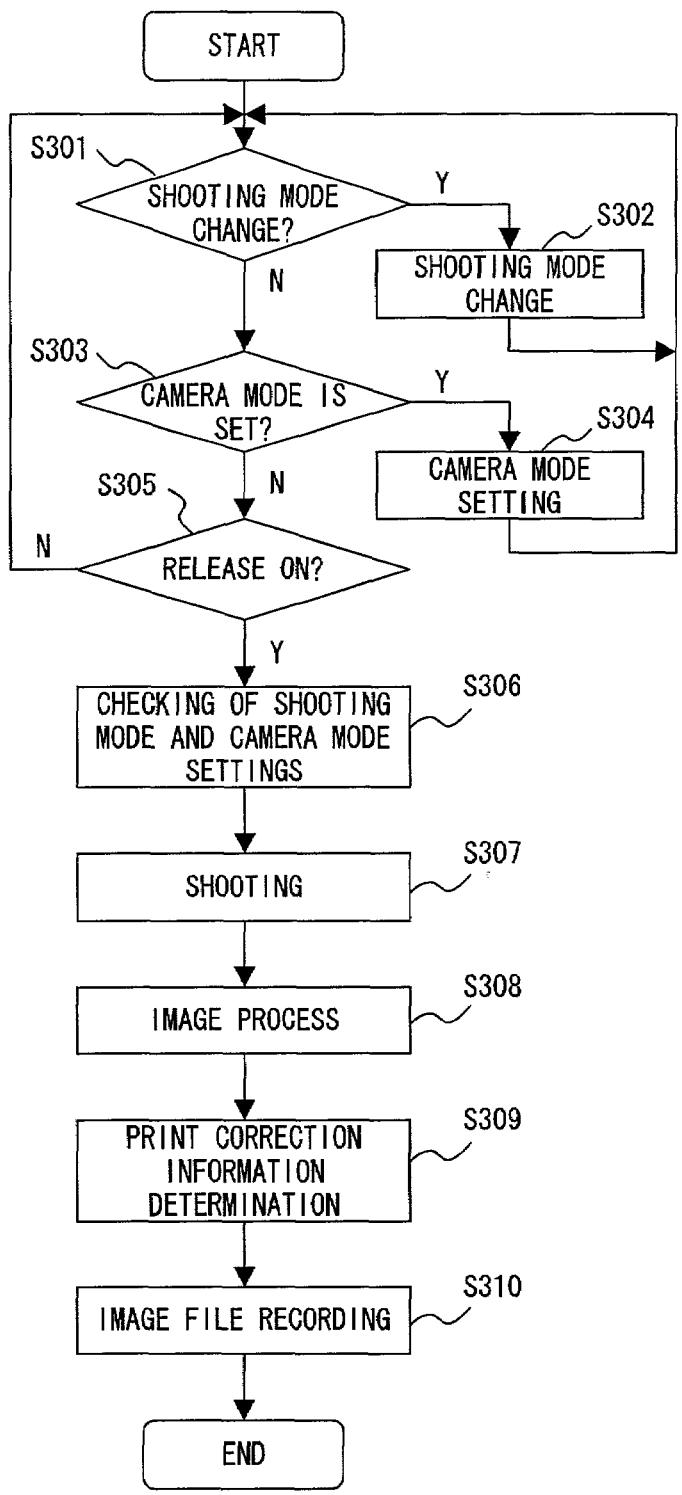
FIG. 3 is a flowchart exemplifying the processes of the electronic camera according to the first preferred embodiment.

FIG. 3 is a flowchart exemplifying the processes of the electronic camera according to the first preferred embodiment. This flowchart principally shows the process for shooting. Note that these are the processes that the system controller 7 performs by executing the control program stored in the ROM 9.

In the process shown in FIG. 3, it is first determined whether or not a shooting mode is changed by a user via the operation unit 21 (step (hereinafter abbreviated to S) 301). If it is determined that the shooting mode is changed ("Y" in S301), the shooting mode is set to the mode changed by the user (S302), and the flow returns to S301. If it is determined that the shooting mode is not changed by the user ("N" in S301), it is next determined whether or not a camera mode is set by the user via the operation unit 21 (S303). If it is determined that the camera mode is set by the user ("Y" in S303), the camera mode is set to the mode set by the user (S304), and the flow returns to S301. Or, if it is determined that the camera mode is not set by the user ("N" in S303), it is then determined whether or not a shooting instruction is given by the user via the operation unit 21, namely, whether or not the release button is pressed by the user (S305). If it is determined that the release button is not pressed ("N" in S303), the flow returns to S301, and a change in the shooting mode by the user and the setting of the camera mode, which are made by the user as described above, are accepted until the release button is determined to be pressed.

If it is determined that the release button is pressed ("Y" in S305), the shooting mode and the camera mode, which are set at that time, are checked (S306), and a shooting process is performed based on the shooting mode and the camera mode (S307). In this shooting process, an image of a subject is captured by the image capturing element 2 based on the set shooting mode and camera mode, and an image signal based on the subject is output. Additionally, a condition (aperture, shutter speed, etc.) for image capturing at this time is set as a condition for image capturing, which is intended to determine/select a correction mode in the process of S309 to be described later. If no change is made in the shooting mode, or no setting is made for a camera mode, the shooting process is performed based on a default shooting mode or a default camera mode.

Then, image processes such as a white balance process, a color correction process, a gray scale correction process, a JPEG compression process, etc. are performed for the captured image signal, so that image data in a predetermined format, which is to be recorded on the memory card, is obtained (S308).

Then, a correction mode is determined/selected from a correction mode selection table, which will be described later, based on the set shooting mode and the condition for image capturing (aperture, shutter speed, etc.), and a correction condition is determined/selected from a correction condition change table, which will be described later, based on the set camera mode. The determined/selected correction mode and condition are obtained as print correction information (S309). Notice that the correction mode is intended to instruct (specify) a process for a correction, which is performed by the printer, when a visible image is formed. Furthermore, the correction condition is intended to instruct a correction condition in a process for a correction, which is performed by the printer, when a visible image is formed. To be more specific, the correction condition is intended to instruct whether or not to make a correction for each of a plurality of processes for a correction when a visible image is formed.

Then, the image data obtained in the process of S308, the print correction information (the correction mode and the correction condition) obtained in the process of S309, and a print correction identifier are recorded on the memory card as one image file. Namely, the print correction information is associated with the image data, and the print correction information in association with the image data is then output to the memory card and recorded. The print correction identifier is an identifier for making the printer perform a correction process (automatic image quality correction process) based on print correction information when a visible image is formed. If the print correction identifier is included in an image file when a visible image is formed, the automatic image quality correction process is performed. If the print correction identifier is not included, the automatic image quality correction process is not performed. Note that the print correction identifier and the print correction information are recorded, for example, in the header of an image file, or in a format conforming to a DCF (Design rule for Camera File system) format if they are recorded in the DCF format.

The above described correction mode selection table and correction condition change table are described next.

FIG. 4A shows the correction mode selection table, whereas FIG. 4B shows the correction condition change table.

The correction mode selection table is first described. The correction mode selection table is a table for selecting a correction mode (a process for a correction when a visible image is formed), in which the shooting intention of a user is reflected with the highest accuracy, based on a shooting mode and a condition for image capturing, which are set at the time of shooting.

As indicated by circles (o) in FIG. 4A, a corresponding correction mode (any one of standard, portrait, landscape, sports, twilight scene, night scene, backlight, macro, sepia, monochrome, and non-correction) is indicated for each of shooting modes (moving image mode, scene mode, filter, strobe mode, and image quality mode) and each of conditions for image capturing (luminance of scene, subject distance, shutter speed, aperture, strobe, and a view angle). However, correction modes corresponding to image quality modes SHQ, HQ, SQ, and TIFF, which are shooting modes, are not indicated.

Furthermore, the shooting modes and the conditions for image capturing are respectively assigned a priority when a correction mode is selected. If a plurality of correction modes are selected based on set shooting mode and condition for image capturing, a correction mode corresponding to the shooting mode or the condition for image capturing with the highest priority is selected. Especially, since a shooting mode is intended to reflect the shooting intention of a user with higher accuracy, its priority is set to be higher than that of a condition for image capturing. In FIG. 4A, priorities 1, 2, 3, 4, 5, 6, and 7 are respectively assigned to the moving image mode, the scene mode, the filter, the strobe mode, the image quality mode, the luminance of scene, the subject distance, the shutter speed, and the aperture, the strobe, and the view angle.

Assuming that the scene mode "snap" and the strobe mode "forcible flash" are set as shooting modes, the correction mode "portrait" that corresponds to the scene mode "snap" with higher priority is selected due to the above described reason. In this case, there is no need to consider a condition for image capturing, judging from the relationship among priorities. Additionally, if the image quality mode "HQ" is set as a shooting mode, no corresponding correction mode exists. Therefore, a correction mode is selected based on another shooting mode and condition for image capturing in such a case. Furthermore, if a shooting mode is not changed and shooting is made in a default state, a correction mode is selected based on a condition for image capturing.

The correction condition change table is described next. The correction condition change table is a table for selecting a correction condition (a correction condition in a process for a correction, which is performed when a visible image is formed) for reflecting the shooting intention of a user with the highest accuracy based on a camera mode set by the user. A selected correction condition instructs a correction process according to the correction condition not to be performed in processes for corrections, which are performed by the printer, when a visible image is formed.

As indicated by crosses (x) in FIG. 4B, a corresponding correction condition (brightness, contrast, white balance, chroma, or sharpness) is indicated for each of camera modes (exposure mode, photometry mode, exposure correction, contrast, chroma, white balance, sharpness, and ISO sensitivity). However, none of the correction conditions are selected depending on a camera mode. For example, no correction conditions are selected for the exposure mode "auto", the photometry mode "center-spot", etc.

Additionally, a plurality of correction conditions are sometimes selected depending on a camera mode. Assuming that the exposure mode "manual" and the chroma "high" are set as camera modes, two correction conditions such as the correction condition "brightness" corresponding to the exposure mode "manual", and the correction condition "chroma" corresponding to the chroma "high" are selected. If shooting is made in a default state without setting a camera mode, a correction condition is not selected.

Next, the data structure of the print correction information composed of the correction mode and condition, which are selected as described above, when being recorded on a memory card is described.

FIG. 5A explains the data structure of print correction information, whereas FIG. 5B exemplifies the data structure of the print correction information.

As shown in FIG. 5A, the print correction information recorded on a memory card is configured by 9 bits. High-order 4 bits among them indicate a correction mode, and the remaining low-order 5 bits indicate a correction condition.

The high-order 4 bits are represented by a bit string corresponding to a selected correction mode. For example, they are represented by "0000" if the correction mode is "standard", or represented by "0001" if the correction mode is "portrait". The other correction modes are represented as shown in FIG. 5A.

Furthermore, each of the low-order 5 bits indicates a correction condition. Namely, the bit 5 (the highest-order bit among the low-order 5 bits) indicates brightness, the bit 4 indicates contrast, the bit 3 indicates white balance, the bit 2 indicates chroma, and the bit 1 (the lowest-order bit among the low-order 5 bits) indicates sharpness. The bit corresponding to the correction condition that is selected based on the correction condition change table is represented by 1. Accordingly, if none of the camera modes are set (a default state), the low-order 5 bits result in "00000".

By way of example, for the print correction information having the data structure shown in FIG. 5B, its high-order 4 bits are "0010", which indicates that "landscape" is selected as a correction mode, and its low-order 5 bits are "10100", which indicates that "brightness" and "white balance" are selected as correction conditions. Namely, the print correction information at this time instructs a correction process according to the correction mode "landscape" to be performed when a visible image is formed, and also instructs the corrections for the brightness and the while balance not to be performed in that correction process.

Processes of the above described printer are described next.

Figure 6:
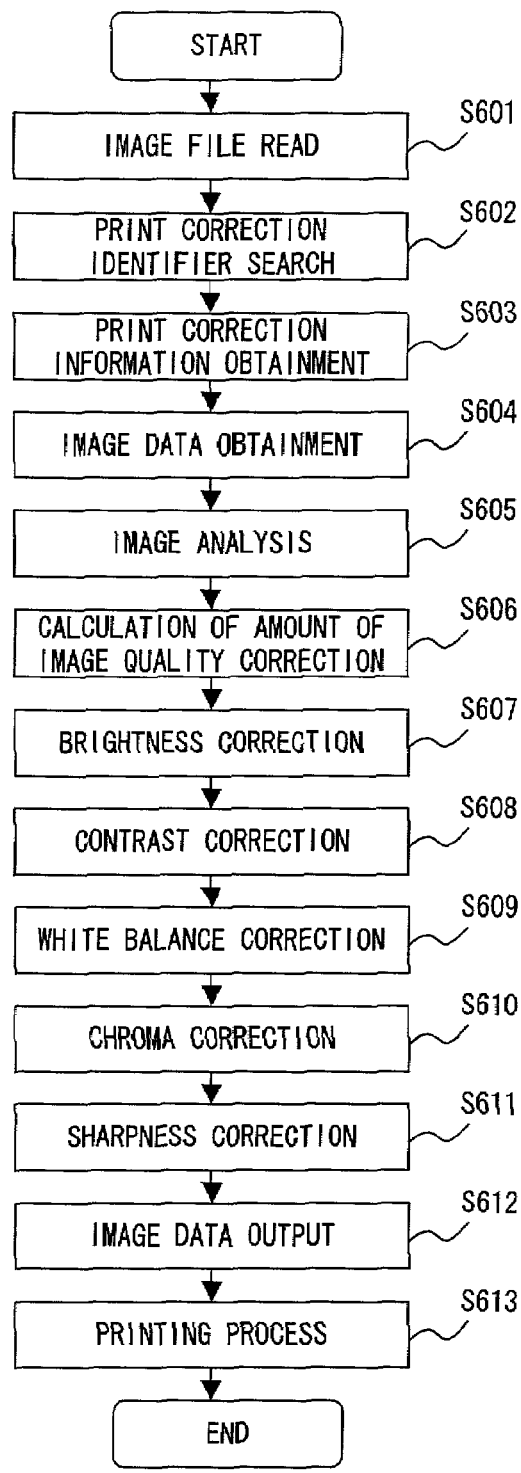
FIG. 6 is a flowchart exemplifying the processes of the printer according to the first preferred embodiment.

FIG. 6 is a flowchart exemplifying the processes performed by the printer according to the first preferred embodiment. These are the processes that the system controller 31 performs by executing the control program stored in the ROM 37. Additionally, the processes shown in this figure are the processes that are started when an instruction to print a predetermined image file which is recorded on the memory card inserted into the card slot 34 is accepted via the operation unit 45.

As shown in this figure, the image file is read from the memory card based on the print instruction (S601).

Then, a print correction identifier is searched in the read image file (S602). If the print correction identifier is not found in the image file as a result of this search, a normal printing process is performed without performing an automatic image quality correction process to be described later. Since the normal printing process is a known technique, its explanation is omitted here.

If the print correction identifier is found in the image file, the automatic image quality correction process to be described later is started. The image file in this case is, for example, the image file recorded in S310 of FIG. 3.

Print correction information (a correction mode and a correction condition) included in the read image file is first obtained (S603). Then, the image data is obtained (S604). The image data obtained here is data for which the decompression process, the resize process, etc. have been performed by the ASIC unit 32.

Next, the brightness, the contrast, the chroma distribution, etc. of the image based on the obtained image data are analyzed (S605).

Then, the amount of correction (the amount of image quality correction) in each of correction processes in the subsequent steps S607 to S611 is calculated based on the result of the analysis and the correction mode indicated by the data of the high-order 4 bits of the print correction information obtained in the process of S603. That is, the amount of correction for a brightness correction, the amount of correction for a contrast correction, the amount of correction for a white balance correction, the amount of correction for a chroma correction, and the amount of correction for a sharpness correction are calculated.

Next, the correction processes in S607 to S611 are performed based on the correction conditions indicated by the data of the low-order 5 bits of the print correction information obtained in the process of S603.

In the process of S607, the data of the bit 5 among the low-order 5 bits of the print correction information is referenced. If the bit 5 is 0, a brightness correction process is performed for the image data based on the amount of correction for the brightness correction, which is calculated in the process of S606. If the bit 5 is 1, the flow proceeds to the next process without performing the brightness correction process.

In the process of S608, the data of the bit 4 among the low-order 5 bits of the print correction information is referenced. If the bit 4 is 0, a contrast correction process is performed for the image data based on the amount of correction for the contrast correction, which is calculated in the process of S606. If the bit 4 is 1, the flow proceeds to the next process without performing the contrast correction process.

In the next process of S609, the data of the bit 3 among the low-order 5 bits of the print correction information is referenced. If the bit 3 is 0, a white balance correction process is performed for the image data based on the amount of correction for the white balance correction, which is calculated in the process of S606. If the bit 3 is 1, the flow proceeds to the next process without performing the white balance correction process.

In the next process of S610, the data of the bit 2 among the low-order 5 bits of the print correction information is referenced. If the bit 2 is 0, a chroma correction process is performed for the image data based on the amount of correction for the chroma correction, which is calculated in the process of S606. If the bit 2 is 1, the flow proceeds to the next process without performing the chroma correction process.

In the next step of S611, the data of the bit 1 among the low-order 5 bits of the print correction information is referenced. If the bit 1 is 0, a sharpness correction process is performed for the image data based on the amount of correction for the sharpness correction, which is calculated in the process of S606. If the bit 1 is 1, the flow proceeds to the next process without performing the sharpness correction process.

Then, the image data for which the above described correction processes in S607 to S611 have been performed is sequentially output to the thermal head controlling unit 38 (S612). Overprinting is then made on paper with the ink ribbons 41 of Y, M, and C by the thermal head controlling unit 38, the paper feed controlling unit 42, etc., so that the printing process based on this image data is performed (S613).

In this way, in the printer, the correction processes (the processes for corrections when a visible image is formed) are performed based on print correction information (a correction mode and a correction condition) according to the shooting operation (camera operation) of a user, whereby the shooting intention of the user can be accurately reflected at the time of printing without performing a particular input operation or giving an instruction, etc.

The electronic camera according to the first preferred embodiment is configured by comprising both the correction mode selection table and the correction condition change table. However, the electronic camera may be configured by comprising, for example, only either of the correction mode selection table and the correction condition change table. In this case, if the electronic camera comprises, for example, only the correction mode selection table, none of the correction conditions are selected. Therefore, the low-order 5 bits of print correction information result in "00000", and all of the correction processes in S607 to S611 of FIG. 6 are performed. Or, if the electronic camera comprises, for example, only the correction condition change table, none of the correction modes are selected. Therefore, the high-order 4 bits of print correction information result in "0000" (standard), and the amount of correction (the amount of image quality correction) in each of the correction processes, which is calculated in the process of S606 in FIG. 6, is calculated based on the correction mode (standard).

Additionally, with the electronic camera according to the first preferred embodiment, an image file (including image data and print correction information) is output (recorded) to a memory card. However, the image file may be output to an external device that is connected to the external input/output terminal 15, for example, a display device, a PC, an external recording device, etc. Additionally, the image file may be output to a recording medium comprised by an external recording device when being output to the external recording device. Besides, the electronic camera may be configured to be connectable to a communications line, and the image file may be output to the communications line.

Furthermore, the printer according to the first preferred embodiment obtains an image file from a memory card. However, the printer may obtain the image file, for example, via a communications cable, a communications line, etc., which is connected to an external input/output terminal, by being provided with an external I/F and the external input/output terminal.

Still further, in the first preferred embodiment, the printer is applied as the image forming apparatus. However, any device may be applied if only it has a configuration for forming a visible image from image data. For instance, a display device, a PC, etc., which displays an image based on image data, maybe considered. In this case, the electronic camera may be configured to output image forming instruction information or correction instruction information, which reflects the shooting intention of a user on an image displayed by the display device, the PC, etc.

As described above, according to the first preferred embodiment, a user only performs a normal shooting operation (camera operation) without performing a particular input operation or giving an instruction, etc., so that his or her shooting intention can be accurately reflected when a visible image is formed.

A second preferred embodiment according to the present invention is described next.

In the second preferred embodiment, print correction information indicates a parameter for an image forming instruction, a correction mode indicates an image forming mode, and a correction condition (an item for which a correction is not made/correction condition change information) indicates image forming condition change information.

Figure 7:
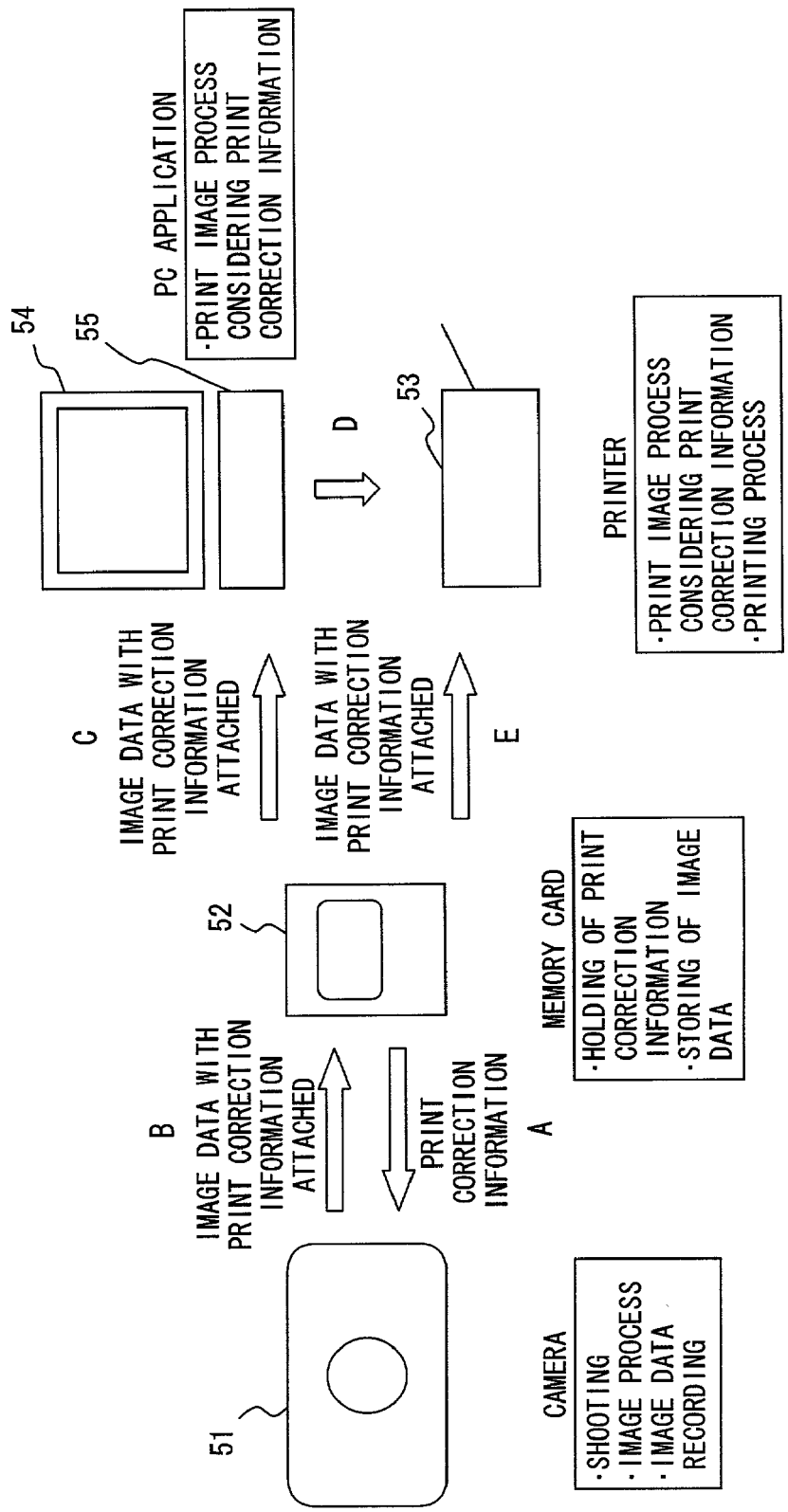
FIG. 7 shows the concept of an electronic camera system according to a second preferred embodiment.

FIG. 7 shows the concept of the electronic camera system according to the second preferred embodiment.

As shown in this figure, this electronic camera system is configured by comprising an electronic camera 51, a memory card (recording medium) 52, a printer 53, a PC (Personal Computer) to which a display 54 is connected, and the like. The printer 53 and the PC 55 including a predetermined application are also an image forming apparatus (image processing apparatus) having an image forming function (an image processing function).

On the memory card 52, print correction information is prerecorded. The print correction information is instruction information used when the printer 53 or the PC 55 forms a print image (visible image) based on image data, and composed of a correction mode and correction condition change information. The print correction information is information recorded in an area that is not erased by the initialization of the memory card 2, for example, at the time of shipment from a factory. Additionally, the amount of data of the print correction information recorded at this time does not become so large as that of program data, etc. Therefore, the original role of recording image data, which the memory card 52 plays, is not degraded.

Upon acceptance of a shooting instruction from a user after the memory card 52 is inserted (an arrow A in FIG. 7), the electronic camera 51 performs an image process for the image data obtained by capturing the image of a field, attaches print correction information read from the memory card 52 to the image data for which a compression process is performed, and records the image data with the print correction information attached on the memory card 52 as one image file (an arrow B in FIG. 7). However, if print correction information is not recorded on an inserted memory card, the electronic camera 51 generates print correction information based on a shooting mode, a shooting condition etc. at the time of shooting, and records the image data with the generated print correction information attached.

Upon acceptance of a print image process instruction (or a print instruction) of the image based on the image data of the image file from the user after the memory card 52 on which the image file including the image data and the print correction information is recorded is inserted into the PC 55 (an arrow C in FIG. 7), the application of the PC 55 reads the image data and the print correction information of the image file, performs a print image process (image forming process) for the image data based on the print correction information, and displays the image based on the obtained image data on the display 54. Or, the application of the PC 55 outputs the obtained image data to the printer 53 (an arrow D in FIG. 7).

Upon receipt of the image data output from the PC 55 (an arrow D in FIG. 7), the printer 53 performs a print process, and prints the image based on the image data on paper.

Or, upon acceptance of a print instruction of the image based on the image data of the image file from the user after the memory card 52 on which the image file including the image data and the print correction information is recorded is inserted (an arrow E shown in FIG. 7), the printer 53 reads the image data and the print correction information of the image file, performs a print image process (image forming process) based on the print correction information for the image data, and performs a print process for the obtained image data, so that the printer 53 prints the image based on the image data on paper.

As described above, this electronic camera system allows the print image process (image forming process) by the application of the PC 55 or the print image process (image forming process) by the printer 53 to be performed based on the print correction information prerecorded on the memory card 52, thereby eliminating the user load of making the settings of an image forming instruction when a print image is formed.

Details of the above described electronic camera system are described below.

In this electronic camera system, configuration of the electronic camera 51 is similar to that shown in FIG. 1. However, in the electronic camera 51, the print correction information determination table (the correction mode selection table and the correction condition change table) stored in the ROM 9 is slightly different from that shown in FIGS. 4A and 4B. Additionally, the correspondences between the print correction information and the correction modes or the correction conditions, which are shown in FIG. 5A, are stored in the ROM 9 as a data table of the print correction information.

FIG. 8A exemplifies the correction mode selection table stored in the ROM 9 of the electronic camera 51 according to the second preferred embodiment, whereas FIG. 8B exemplifies the correction condition change table stored in the ROM 9 of the electronic camera 51 according to the second preferred embodiment.

In the correction mode selection table shown in FIG. 8A, the conditions for image capturing in the above described correction mode selection table shown in FIG. 4A are represented as shooting conditions, and the image quality modes are omitted. Accordingly, the conditions having the priorities 6 and 7 are represented as conditions having the priorities 5 and 6 in FIG. 8A. In the second preferred embodiment, the correction modes indicate image forming modes, which are comprised by the printer 53 or the PC 55, when the print image process is performed. The others are the same as those explained with reference to FIG. 4A. With this correction mode selection table, a correction mode corresponding to a shooting mode or condition having the highest priority is selected based on the priorities of the set shooting mode and condition.

Furthermore, the correction condition change table shown in FIG. 8B is represented as a table in which the camera mode settings in the above described correction condition change table shown in FIG. 4B are represented as shooting mode settings. In the second preferred embodiment, 5 items cited as correction conditions indicate the items of correction processes (image forming process) performed by the printer 53 or the application of the PC 55. The others are the same as those explained with reference to FIG. 4B. With this correction condition change table, a corresponding correction condition (an item for which a correction is not made/correction condition change information) is selected based on a set shooting mode.

In this electronic camera system, configuration of the printer 53 is similar to that shown in FIG. 2. However, the printer 53 comprises a function for accepting a correction mode instruction via the operation unit 45, and for performing a print image process based on the correction mode set according to the instruction. Additionally, the printer 53 is configured by comprising an external I/F and an external input/output terminal so as to be able to exchange data with an external device (such as the PC 55, etc.) which is connected to the external input/output terminal via the external I/F.

Processes of this electronic camera system are described next.

Figure 9:
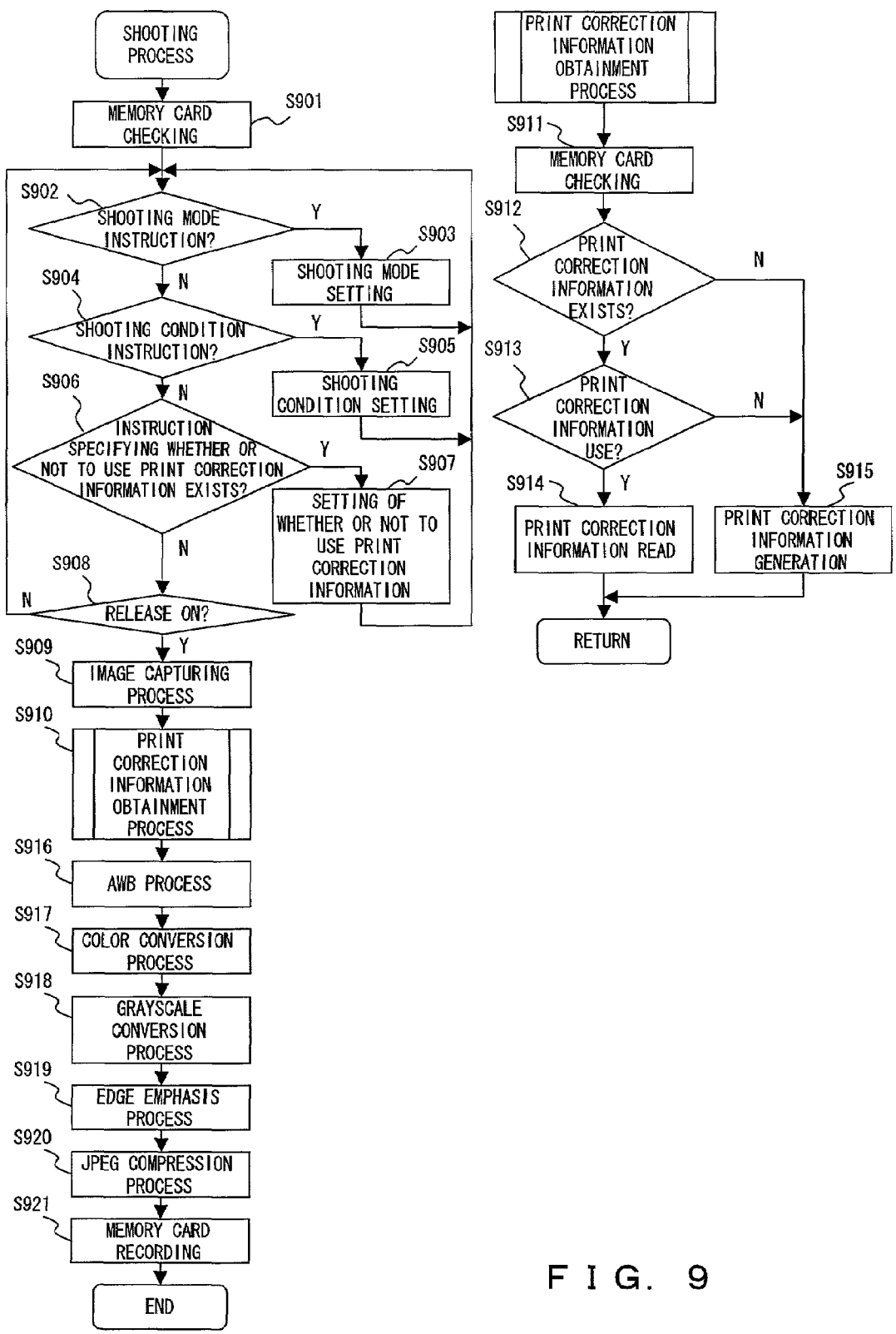
FIG. 9 is a flowchart exemplifying a shooting process performed by the electronic camera according to the second preferred embodiment.

FIG. 9 is a flowchart exemplifying the shooting process performed by the electronic camera 51. The processes shown in this figure are the processes that the system controller 7 performs by executing the control program stored in the ROM 9.

In the shooting process shown in this figure, it is first checked whether or not a memory card is inserted into the card slot 12 (step (hereinafter abbreviated to S) 901). If the memory card is inserted, a shooting mode instruction (S902), a shooting condition instruction (S904), an instruction specifying whether or not to use print correction information (S906), etc. from a user are accepted until a shooting instruction (release button ON) from the user is accepted via the operation unit 21 ("Y" in S908). The instruction specifying whether or not to use print correction information is an instruction by which a user instructs whether or not to use the print correction information recorded on the memory card.

Upon acceptance of these instructions ("Y" in S902, "Y" in S904, and "Y" in S906), the shooting mode (S903), the shooting condition (S905), and whether or not to use print correction information are set according to the instructions. By default, the use of print correction information is set.

Upon acceptance of the shooting instruction (release button ON) from the user ("Y" in S908), an image capturing process is performed based on the shooting mode and condition, which are set according to the above described instructions from the user, or the shooting mode and condition, which are automatically set according to a field to be image-captured (S909). In the image capturing process, the optical image of a subject (field) that the zoom lens system 1 produces is optoelectrically converted (image-captured) by the image capturing element 2, an image signal being a conversion output is input to the A/D conversion circuit 4 via the image capturing circuit 3, and the digital image data obtained by the A/D conversion is stored in the RAM 10.

Then, a print correction information obtainment process is performed (S910). This process is performed according to the flow shown on the right side of FIG. 9. Firstly, an inserted memory card is checked (S911), and it is determined whether or not print correction information is recorded on the memory card (S912). If the print correction information is recorded at this time ("Y" in S912), it is then determined whether or not the use of the print correction information is set (S913). If the use of the print correction information is set ("Y" in S913), the print correction information is read from the memory card (S914). Here, the flow returns.

If the print correction information is not recorded on the inserted memory card ("IN" in S912), or if the use of the print correction information is not set ("IN" in S913), corresponding correction mode and condition (an item for which a correction is not made/correction condition change information) are selected from the correction mode selection table shown in FIG. 8A and the correction condition change table shown in FIG. 8B based on the shooting mode and condition, which are set according to the instructions from the user, or the shooting mode and condition, which are automatically set according to the field to be image-captured. Then, 9 bit print correction information corresponding to the selected correction mode and condition is generated from the print correction information data table, which represents the correspondences of FIG. 5A (S915). Here, the flow returns.

Next, an AWB (Auto White Balance) process (S916), a color conversion process (S917), a gray scale conversion process (S918), and an edge emphasis process (S919) are performed for the image data stored in the RAM 10 in the image capturing process of S909.

Then, a JPEG compression process is performed for the obtained image data (S920). Supplementary information including either of the print correction information read from the memory card in the process of S914, and the print correction information generated in the process of S915 is attached to the image data, which is then recorded on the memory card as one image file (S921). Here, this flow is terminated.

According to such a flow, print correction information prerecorded on a memory card can be included in the supplementary information of an image file, and later, a print image process (image forming process) can be performed based on the print correction information included in the supplementary information. Additionally, with the instruction specifying whether or not to use print correction information, a user can make the printer perform the print image process by selecting whether this process is performed either based on the print correction information prerecorded on a memory card, or based on the print correction information generated according to the shooting mode and condition, which are set at the time of shooting.

In the flow shown in FIG. 9, the instruction specifying whether or not to use print correction information, which is given from a user, can be accepted. However, for example, if print correction information is read from a memory card, the read print correction information may be forcibly included in supplementary information.

The structure of an image file recorded on a memory card in the shooting process shown in FIG. 9 is described next.

FIG. 10A exemplifies the structure of the image file recorded in the shooting process shown in FIG. 9, whereas FIG. 10B exemplifies the structure of the image file recorded in a normal shooting process (not shown)

As shown in FIG. 10A, the structure of the image file recorded in the shooting process shown in FIG. 9 is configured by supplementary information, which is composed of a file identifier, an image size, a print correction identifier, and print correction information, and image data.

The file identifier is intended to indicate that a corresponding image file is a predetermined image file, and represented by a 4-byte fixed value such as "OLRF".

The image size is intended to indicate the width and the height of an image, which are respectively represented by 2 bytes. For example, the width is "1600", and the height is "1200".

The print correction identifier is intended to indicate that a corresponding image file is an image file including print correction information, and represented by a 2-byte fixed value such as "OLPP".

The print correction information is intended to indicate a correction mode and a correction condition (an item for which a correction is not made/correction condition change information), and represented by 2 bytes such as "84". Note that "84" is a value which represents the above described print correction information shown in FIG. 4B in decimal notation. This indicates that the correction mode is "landscape", and items for which corrections are not made are "brightness" and "white balance" of the print correction information.

The image data is intended to indicate image data for which the JPEG compression process is performed, and represented by the amount of data, which is dependent on image data.

In the meantime, the structure of the image file recorded in the normal shooting process (not shown) is configured by supplementary information, which is composed of a file identifier and an image size, and image data. The file identifier, the image size, and the image data are the same as those shown in FIG. 10A. As described above, the image file recorded in the normal shooting process does not include a print correction identifier and print correction information.

The printing process (including a print image process) performed by the printer 53 is described next. This process is a process that the system controller 31 performs by executing the control program stored in the ROM 37.

Figure 11:
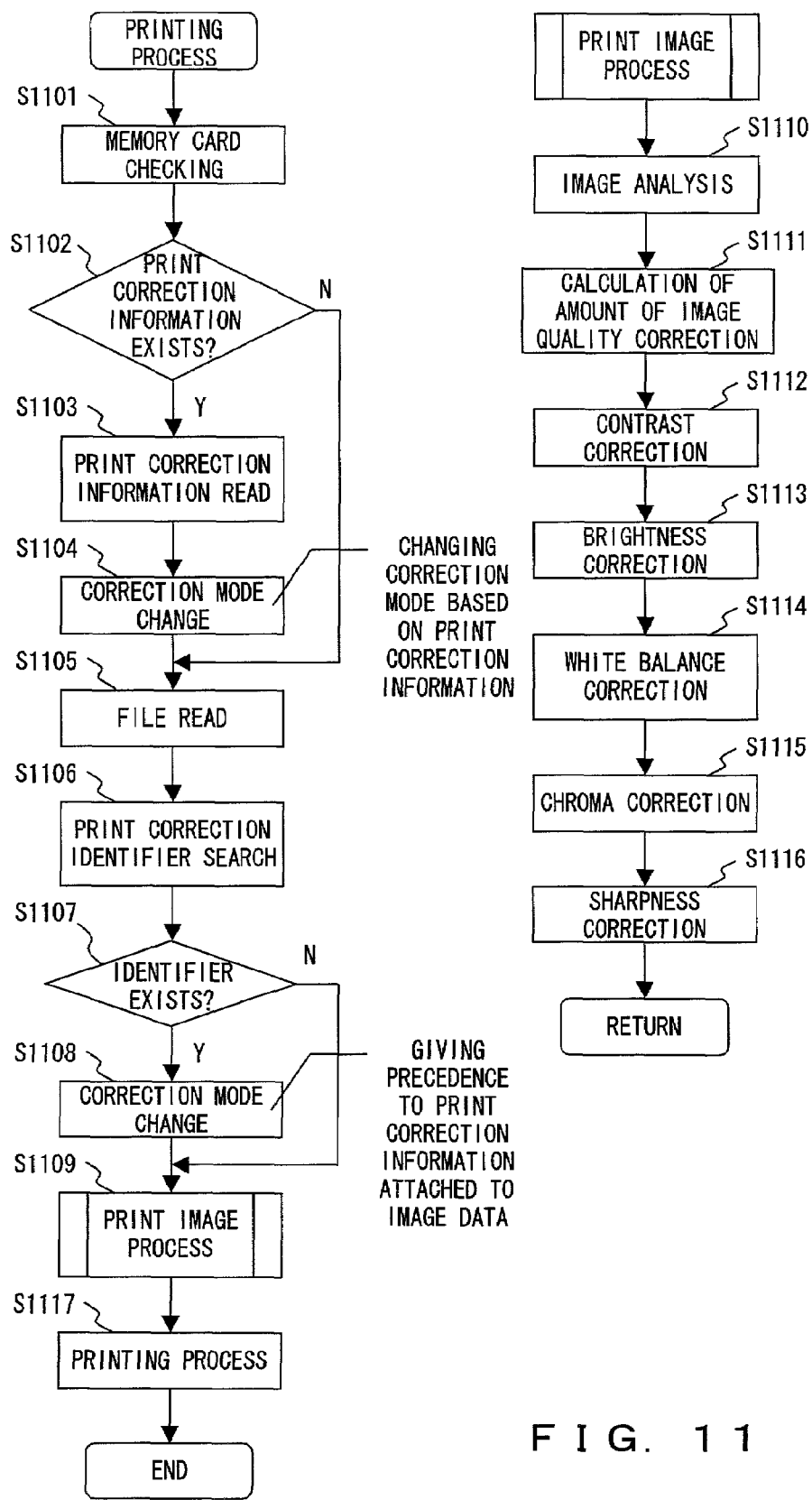
FIG. 11 is a flowchart exemplifying a printing process performed by a printer according to the second preferred embodiment.

FIG. 11 is a flowchart exemplifying the printing process performed by the printer 53.

The flow shown in this figure is a process that is started when a memory card is inserted into the card slot 34, and a user gives a print instruction for an image of a predetermined image file among the image files recorded on the memory card. At this time, the user may instruct a correction mode used when the print image process is performed. By default, "standard" is set as a correction mode.

As shown in FIG. 11, when the print instruction is given for the image of the predetermined image file, the memory card is first checked (S1101), and it is determined whether or not print correction information prerecorded on the memory card exists (S1102). If the print correction information exists ("Y" in S1102), it is read (S1103), and the set correction mode is changed to the correction mode indicated by the read print correction information (S1104).

If the print correction information prerecorded on the memory card does not exist ("N" in S1102), the above described processes of S1103 and S1104 are skipped.

Then, the image file for which the print instruction is given is read from the memory card (S1105). A print correction identifier is searched in the supplementary information of the image file (S1106), and it is determined whether or not the print correction identifier exists. If the print correction identifier exists ("Y" in S1107), the set correction mode is changed to the correction mode indicated by the print correction information within the supplementary information (S1108).

If the print correction identifier does not exist ("N" in S1107), the correction mode is not changed, and the process of S1108 is skipped.

As described above, if print correction information prerecorded on a memory card exists, and if print correction information is included in the supplementary information of an image file, precedence is given to the print correction information included in the supplementary information of the image file, and the correction mode indicated by this print correction information is set.

Then, the print image process (image forming process) is performed (S1109). This process is performed according to the flow shown on the right side of FIG. 11. Firstly, an image based on the image data of the image file is analyzed (S1110). Note that the image data analyzed at this time is image data for which the decompression process has been performed by the ASIC unit 32.

Next, the amount of image quality correction used in each of correction processes in S1112 to S1116 is calculated based on a result of the image analysis and the set correction mode (S1111).

Then, each of the correction processes in S1112 to S1116 is performed based on the calculated amount of image quality correction for each of the correction processes. Namely, a contrast correction process is performed for the image data based on the calculated amount of contrast correction (S1112), a brightness correction process is performed based on the calculated amount of brightness correction (S1113), a white balance correction process is performed based on the calculated amount of white balance correction (S1114), a chroma correction process is performed based on the calculated amount of chroma correction (S1115), and a sharpness correction process is performed based on the calculated amount of sharpness correction (S1116). Here, the flow returns. However, in the correction processes in S1112 to S1116, if an item for which a correction is not made is indicated by the correction condition change information of the read print correction information, the correction process for that item is skipped. Assuming that the print correction information is the information shown in FIG. 4B, the brightness correction process in S1113 and the white balance correction process in S1114 are not performed. Also for the correction condition change information, precedence is given to print correction information included in the supplementary information of an image file in a similar manner as in the above described correction mode, if print correction information prerecorded on a memory card exists, and if the print correction information is included in the supplementary information of the image file. Then, the correction processes in S1112 to S1116 are performed based on the correction condition change information indicated by this print correction information.

When the image data of a print image is generated in this way, the printing process is performed for the print image actually on paper (S1117). Here, this flow is terminated.

According to such a flow, the printer 53 performs the printing process based on print correction information included in the supplementary information of an image file, if print correction information prerecorded on a memory card exists, and if the print correction information is included in the supplementary information of the image file. Or, if the print correction information prerecorded on the memory card exists, and if the print correction information is not included in the supplementary information of the image file, the printing process is performed based on the print correction information prerecorded on the memory card. Or, if the print correction information prerecorded on the memory card does not exist, and if the print correction information is included in the supplementary information of the image file, the printing process is performed based on the print correction information included in the supplementary information of the image file. Accordingly, the printer 53 can perform the printing process based on the print correction information prerecorded on a memory card or the print correction information included in the supplementary information of an image file, thereby eliminating the user load of making the settings of an image forming instruction when a print image is formed.

In the flow shown in FIG. 11, the processes up to the generation of a print image (S1116) may be performed by the application of the PC 55, or another image forming apparatus.

Additionally, in the second preferred embodiment, a correction mode and correction condition change information are included in the print correction information prerecorded on a memory card. However, either of the correction mode and the correction condition change information may be included.

Additionally, with the electronic camera 51 according to the second preferred embodiment, an image file (including image data and print correction information is output (recorded) to a memory card. However, the image file may be output to an external device, such as a display device, a PC, an external recording device, etc., which is connected to the external input/output terminal 15. Furthermore, the electronic camera 51 may be configured to be connectable to a communications line, and data (an image file, etc.) may be exchanged via the communications line.

Furthermore, the printer 53 according to the second preferred embodiment obtains an image file from a memory card. However, the printer 53 may obtain an image file, for example, via a communications cable, a communications line, etc., which is connected to the above described external input/output terminal.

As described above, the second preferred embodiment can eliminate the user load of making the settings of an image forming instruction, such as the printing, the display, etc. of a shot image, when a visible image is formed.

A third preferred embodiment according to the present invention is described next.

In the third preferred embodiment, an image process parameter indicates a parameter for an image process setting, a predetermined shooting mode among shooting modes indicates an image processing mode, and a print correction value indicates image forming instruction information.

Figure 12:
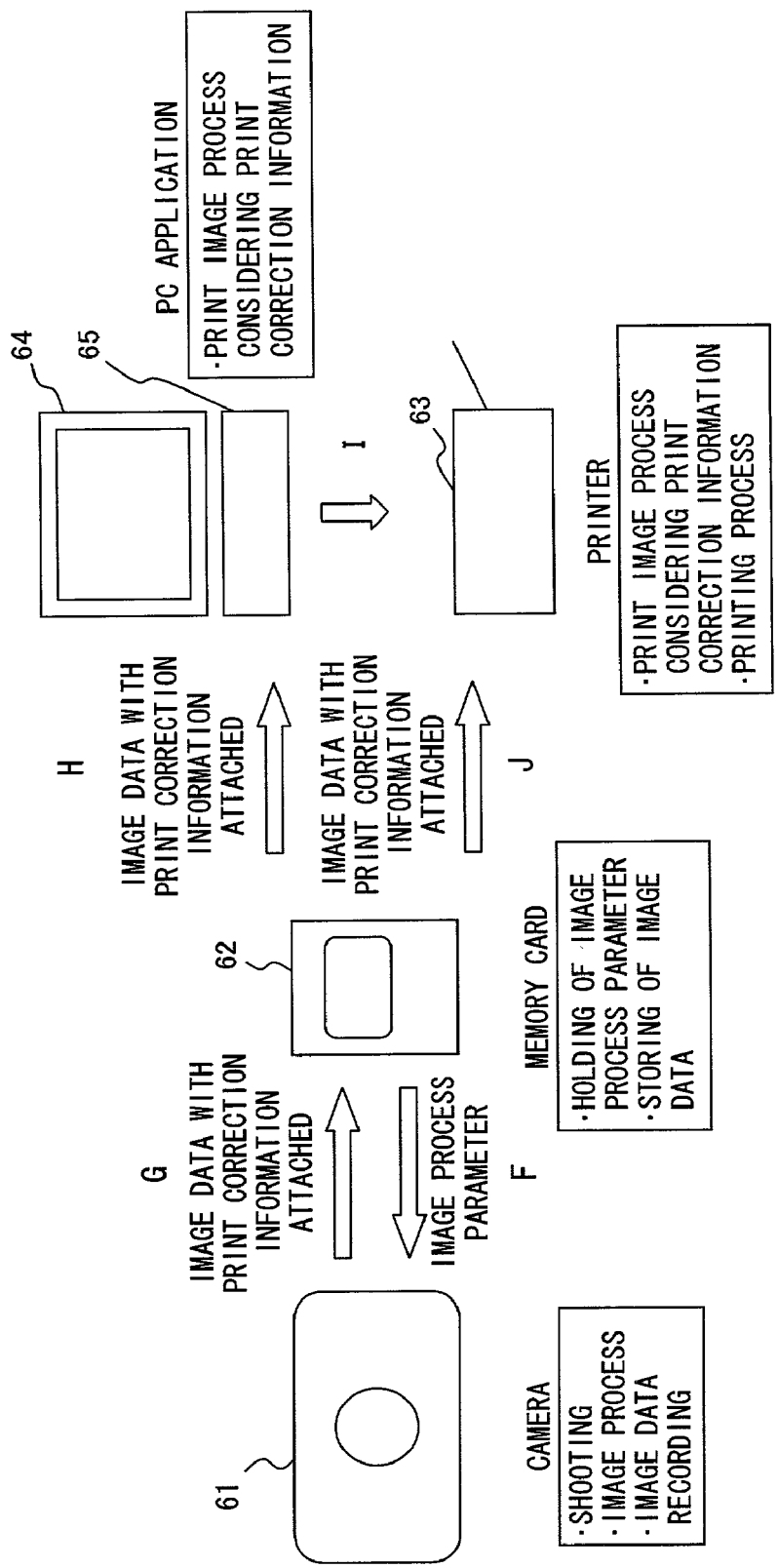
FIG. 12 shows the concept of an electronic camera system according to a third preferred embodiment.

FIG. 12 shows the concept of an electronic camera system according to the third preferred embodiment.

As shown in this figure, this electronic camera system is configured by comprising an electronic camera 61, a memory card (recording medium) 62, a printer 63, a PC (Personal Computer) 65 to which a display 64 is connected, and the like. The PC 65 includes an application for forming an image. The PC 65 and the printer 63 are also an image forming apparatus.

On the memory card 62, an image process parameter for instructing an image process setting of each of the image processes (contrast, chroma, white balance, sharpness, etc.) performed by the electronic camera 61 is prerecorded. This image process parameter is recorded in an area that is not erased by the initialization of the memory card 62, for example, at the time of shipment from a factory. Additionally, the amount of data of the image process parameters recorded at this time is not so large as that of program data, etc. Therefore, the original role of recording image data, which the memory card 62 plays, is not degraded.

When the memory card 62 is inserted (indicated by an arrow F in FIG. 12), and the electronic camera 61 accepts a shooting instruction from a user, it performs an image process for the image data obtained by capturing the image of a field according to the image process setting which corresponds to the image process parameter read from the memory card 62, performs a compression process for the image data, and records the image data on the memory card 62. In this way, a predetermined image process is performed without requiring a user to make troublesome settings, which eliminates the user load of making image process settings.

Or, when the memory card 62 is inserted (indicated by the arrow F in FIG. 12), and the electronic camera 61 accepts the shooting instruction from a user, it performs an image process for the image data obtained by capturing the image of a field, attaches to the image data, for which the compression process is performed, print correction information including the print correction value obtained based on the image process parameter read from the memory card 62, and records the image data with the print correction information attached as one image file (indicated by an arrow G in FIG. 12). This print correction information is instruction information used when the PC 65 or the printer 63 forms a print image (visible image) based on the image data of the image file. In this way, a predetermined print correction value is obtained without requiring a user to make troublesome settings, which eliminates the user load of making image forming instruction settings.

When the memory card 62 on which the image file including the image data and the print correction information is recorded is inserted (indicated by an arrow H in FIG. 12), and the PC 65 accepts from a user a print image process instruction (image forming process instruction) for an image based on the image data of the image file, it reads the image data and the print correction information within the image file, and performs for the image data the print image process (image forming process) based on the print correction information. The image based on the obtained image data is displayed, for example, on the display 64. Or, the obtained image data is output to the printer 63 (indicated by an arrow I in FIG. 12).

Upon receipt of the image data output from the PC 65 (indicated by the arrow I in FIG. 12), the printer 63 performs the printing process, so that the image based on the image data is printed on paper.

Or, when the memory card 62 on which the image file including the image data and the print correction information is recorded is inserted (indicated by an arrow J in FIG. 12), and the printer 63 accepts a print instruction for the image based on the image data within the image file, it reads the image data and the print correction information within the image file, performs for the image data a print image process (image forming process) based on the print correction information, and prints the image based on the image data on paper by performing the printing process for the obtained image data.

As described above, with this electronic camera system, the image process by the electronic camera 61, and the print image process (image forming process) by the PC 65 or the printer 63 can be performed based on an image process parameter prerecorded on the memory card 62, thereby reducing the user load of making various settings required for these processes.

Details of the above described electronic camera system are described below.

In this electronic camera system, configuration of the electronic camera 61 is similar to that shown in FIG. 1. However, in the electronic camera 61, a difference exists in a print correction information determination table stored in the ROM 9. Namely, in the third preferred embodiment, the above described correction mode selection table shown in FIG. 8A, and a print correction value selection table are stored as a print correction information determination table. The print correction value selection table is also an image process setting selection table.

FIG. 13 shows the print correction value selection table.

The table shown in this figure is a table that represents an image process parameter and a print correction value, which correspond to an image process setting for each of items (contrast, chroma, white balance, and sharpness) of image processes performed by the electronic camera 61. These image process items are also correction process items used when the printer 63 and the PC 65 perform a print image process. According to this table, corresponding image process setting and print correction value can be selected based on the image process parameter of a predetermined image process item. Assuming that the image process parameter of the image process item "chroma" is "0", "normal" is selected as the corresponding image process setting, and "50" is selected as a print correction value. Note that each of the print correction values is represented by a value ranging from "0" to "100", and "50" is the "normal".

Additionally, the image process setting for each of the image process items shown in FIG. 13 can be also made according to a shooting mode instruction from a user. Namely, some of the shooting modes indicate the image process setting of an image process performed by the electronic camera 61. Therefore, a predetermined shooting mode is also an image process mode. In the third preferred embodiment, contrast, chroma, white balance, and sharpness are shooting modes in such a form.

Furthermore, in this electronic camera system, configuration of the printer 63 is similar to that of the above described printer 53 referred to in the second preferred embodiment.

Processes performed by this electronic camera system are described next.

Figure 14:
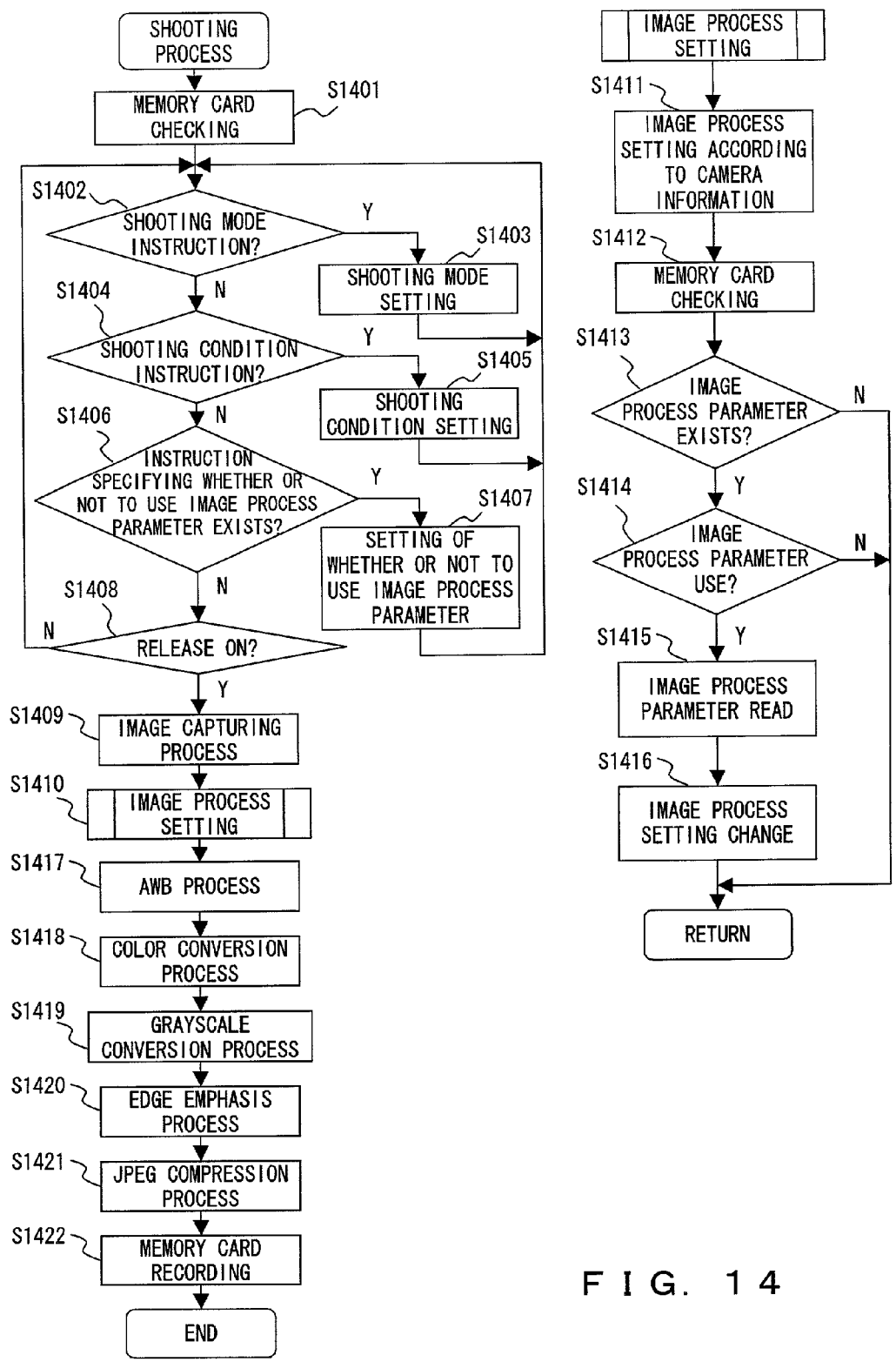
FIG. 14 is a flowchart exemplifying a shooting process performed by an electronic camera according to the third preferred embodiment.
Figure 15:
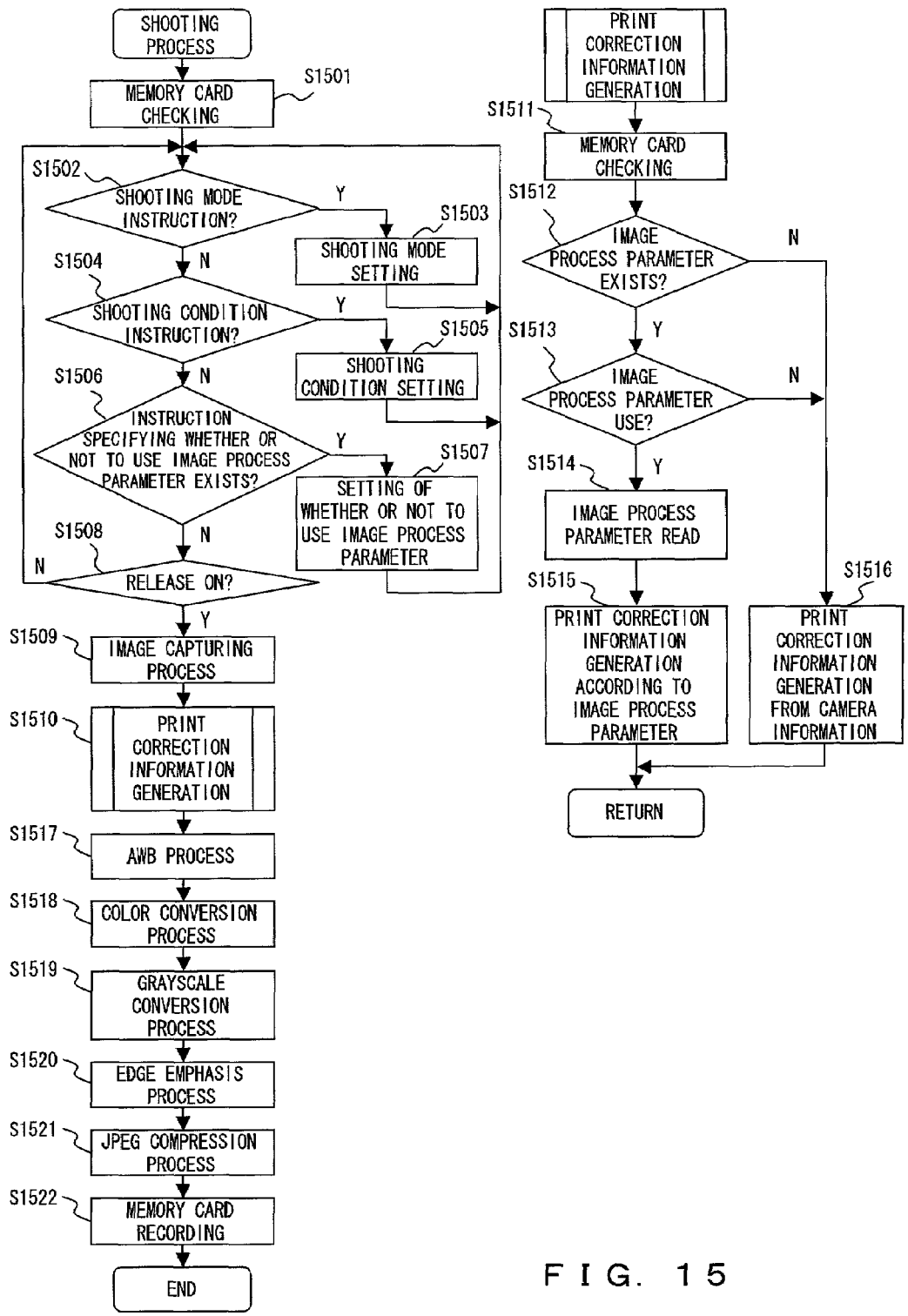
FIG. 15 is a flowchart exemplifying the shooting process performed by the electronic camera according to the third preferred embodiment.

FIGS. 14 and 15 are flowcharts exemplifying the shooting process performed by the electronic camera 61. The flow shown in FIG. 14 exemplifies the shooting process performed when an image process setting is made based on an image process parameter read from the memory card 62, whereas the flow shown in FIG. 15 exemplifies the shooting process performed when a print correction value (image forming instruction information) is generated based on an image process parameter read from the memory card 62. The processes shown in FIGS. 14 and 15 are processes that the system controller 7 performs by executing the control program stored in the ROM 9.

In the shooting process shown in FIG. 14, it is first checked whether or not a memory card is inserted into the card slot 12 (step (hereinafter abbreviated to S) 1401). If the memory card is inserted, a shooting mode instruction (S1402), a shooting condition instruction (S1404), an instruction specifying whether or not to use an image process parameter (S1406), etc. from a user are accepted until a shooting instruction (release button ON) from the user is accepted via the operation unit 21 ("Y" in S1408). Upon acceptance of these instructions ("Y" in S1402, "Y" in S1404, and "Y" in S1406), the shooting mode (S1403), the shooting condition (S1405), and whether or not to use an image process parameter (S1407) as instructed are set. By default, the use of an image process parameter is set.

Upon acceptance of the shooting instruction (release button ON) from the user ("Y" in S1408), an image capturing process is performed based on the shooting mode and condition, which are set according to the above described instructions from the user, or the shooting mode and condition, which are automatically set according to a field to be image-captured (S1409). In this image capturing process, the optical image of a subject (field) that the zoom lens system 1 produces is optoelectrically converted (image-captured) by the image capturing element 2, an image signal being a conversion output is input to the A/D conversion circuit 4 via the image capturing circuit 3, and digital image data obtained by the A/D conversion is stored in the RAM 10.

Then, an image process setting is made (S1410). This image process setting is made according to the flow shown on the right side of FIG. 14. Firstly, an image process setting is made based on the shooting mode set according to the instruction from the user or the shooting mode which is automatically set according to a field to be image-captured (S1411). Since some of the shooting modes indicate an image process setting as described above, the image process setting can be made based on a set shooting mode. Then, the inserted memory card is checked (S1412), and it is determined whether or not image process parameters prerecorded on the memory card exist (S1413). If the image process parameters exist ("Y" in S1413), it is then determined whether or not the use of the image process parameters is set (S1414). If the use of the image process parameters is set ("Y" in S1414), the image process parameters are read from the memory card (S1415), and the image process settings corresponding to the read image process parameters are selected from the image process setting selection table (print correction value selection table) shown in FIG. 13, and the image process settings made in the process of S1411 are changed to the selected image process settings (S1416). Here, the flow returns. For example, if the image process parameters recorded on the memory card are "contrast: 1", "chroma:1", "white balance: 0", and "sharpness:2", image process settings such as "contrast (gray scale conversion process):high", "chroma (color conversion process):high", "white balance (AWB process): normal", and "sharpness (edge emphasis process):low" are made.

If the image process parameters prerecorded on the inserted memory card do not exist ("N" in S1413), or if the use of image process parameters is not set ("N" in S1414), the flow returns as the image process settings made in the process of S1411 are left unchanged.

Next, an AWB process (S1417), a color conversion process (S1418), a gray scale conversion process (S1419), and an edge emphasis process (S1420) are performed for the image data stored in the RAM 10 in the image capturing process of S1409 based on the image process settings.

Then, a JPEG compression process is performed for the obtained image data (S1421). Supplementary information including an image size, etc. is attached to the image data, which is then recorded on the memory card as one image file (S1422). Here, this flow is terminated.

According to such a flow, a predetermined image process setting can be made based on an image process parameter prerecorded on a memory card. Accordingly, a predetermined image process setting can be made without requiring a user to make troublesome settings (shooting mode instruction, etc.), which eliminates the user load of making the settings.

The above described process of S1416 is, in other words, a process for changing a set shooting mode (image process mode) based on a read image process parameter. The image processes of S1417 to S1420 in this case are also processes performed based on the changed shooting mode (image process mode).

The shooting process shown in FIG. 15 is described next. In the shooting process shown in this figure, processes of S1501 to S1509 are similar to those of S1401 to S1409 shown in FIG. 14. Therefore, their explanations are omitted here.

In FIG. 15, upon termination of the processes up to the image capturing process (S1509), a print correction information generation process is performed next (S1510). This process is performed according to the flow shown on the right side of FIG. 15. Firstly, the inserted memory card is checked (S1511), and it is determined whether or not an image process parameter prerecorded on the memory card exists (S1512). If the image process parameter exists ("Y" in S1512), it is next determined whether or not the use of the image process parameter is set (S1513). If the use of the image process parameter is set ("Y" in S1513), the image process parameter is read from the memory card (S1514), the print correction value corresponding to the read image process parameter is selected from the print correction value selection table shown in FIG. 13, and a correction mode is selected from the correction mode selection table shown in FIG. 8A based on the shooting mode and condition, which are set according to the instructions from the user, or the shooting mode and condition, which are automatically set according to a field to be image-captured, so that the print correction information composed of the print correction value and the correction mode is generated (S1515). Here, the flow returns.

If the image process parameter prerecorded on the inserted memory card does not exist ("N" in S1512), or if the use of the image process parameter is not set ("N" in S1513), a print correction value is selected from the print correction value selection table shown in FIG. 13 based on the shooting mode set according to the instruction from the user, or the shooting mode which is automatically set according to a field to be image-captured, and a correction mode is selected from the correction mode selection table shown in FIG. 8A based on the shooting mode and condition, which are set according to the instructions from the user, or the shooting mode and condition, which are automatically set according to a field to be image-captured, so that the print correction information composed of the print correction value and the correction mode is generated (S1516). Here, the flow returns.

Next, an AWB process (S1517), a color conversion process (S1518), a gray scale conversion process (S1519), and an edge emphasis process (S1520) are performed for the image data stored in the RAM 10 in the image capturing process of S1509 based on the shooting mode set according to the instruction from the user, or the shooting mode automatically set according to a field to be image-captured.

Then, a JPEG compression process is performed for the obtained image data (S1521). Supplementary information including the generated print correction information is attached to the image data, which is then recorded on the memory as one image file (S1522). Here, this flow is terminated.

According to such a flow, a predetermined print correction value can be obtained based on an image process parameter prerecorded on a memory card. Accordingly, a predetermined image forming instruction setting can be made without requiring a user to make troublesome settings (shooting mode instruction, etc.), which eliminates the user load of making the settings With the electronic camera 61 according to the third preferred embodiment, the instruction specifying whether or not to use an image process parameter, which is given from a user, can be accepted. However, for example, for an electronic camera that cannot accept this instruction, an image process setting may be forcibly made based on a read image process parameter, or a print correction value may be forcibly generated based on a read image process parameter.

The structure of an image file recorded on a memory card in the shooting process shown in FIG. 14 or 15 is described next.

FIG. 16A shows the structure of the image file recorded in the shooting process shown in FIG. 14, whereas FIG. 16B shows the structure of an image file recorded in the shooting process shown in FIG. 15.

As shown in FIG. 16A, the structure of the image file recorded in the shooting process shown in FIG. 14 is configured by supplementary information composed of a file identifier and an image size, and image data.

The file identifier is intended to indicate that a corresponding image file is a predetermined image file, and represented by a 4-byte fixed value such as "OLRF".

The image size is intended to indicate the width and the height of an image, which are respectively represented by 2 bytes. For example, the width is "1600", and the height is "11200".

The image data is intended to indicate image data for which the JPEG compression process is performed, and represented by the amount of data, which is dependent on the image data.

In the meantime, as shown in FIG. 16B, the structure of the image file recorded in the shooting process shown in FIG. 15 is configured by supplementary information composed of a file identifier, an image size, a print correction identifier, and print correction information, and image data. The file identifier, the image size, and the image data are similar to those shown in FIG. 16A.

The print correction identifier is intended to indicate that a corresponding image file is an image file having print correction information, and represented by a 2-byte fixed value such as "OLPP".

The print correction information is intended to indicate a correction mode and print correction values of respective image process (correction process) items. The correction mode is represented by 1 byte, and is, for example, "0 (standard)". The print correction value for each of the image process (correction process) items is represented by 1 byte. For example, contrast is "70", chroma is "70", white balance is "50", and sharpness is "30".

The data of a correction mode at this time is obtained, for example, from a data table, etc.

FIG. 17 exemplifies the data table of the correction modes. This data table is a data table into which the correspondences that are represented by the high-order 4 bits of the print correction information in FIG. 5A, and referred to in the above described second preferred embodiment are put. This data table is stored, for example, in the ROM 9.

As shown in FIG. 17, 4-bit data corresponding to each of the correction modes is represented. For instance, if the correction mode is "twilight scene", "0101" is obtained as the corresponding data.

The printing process (including the print image process) performed by the printer 63 is described next. This process is a process that the system controller 31 performs by executing the control program stored in the ROM 37.

Figure 18:
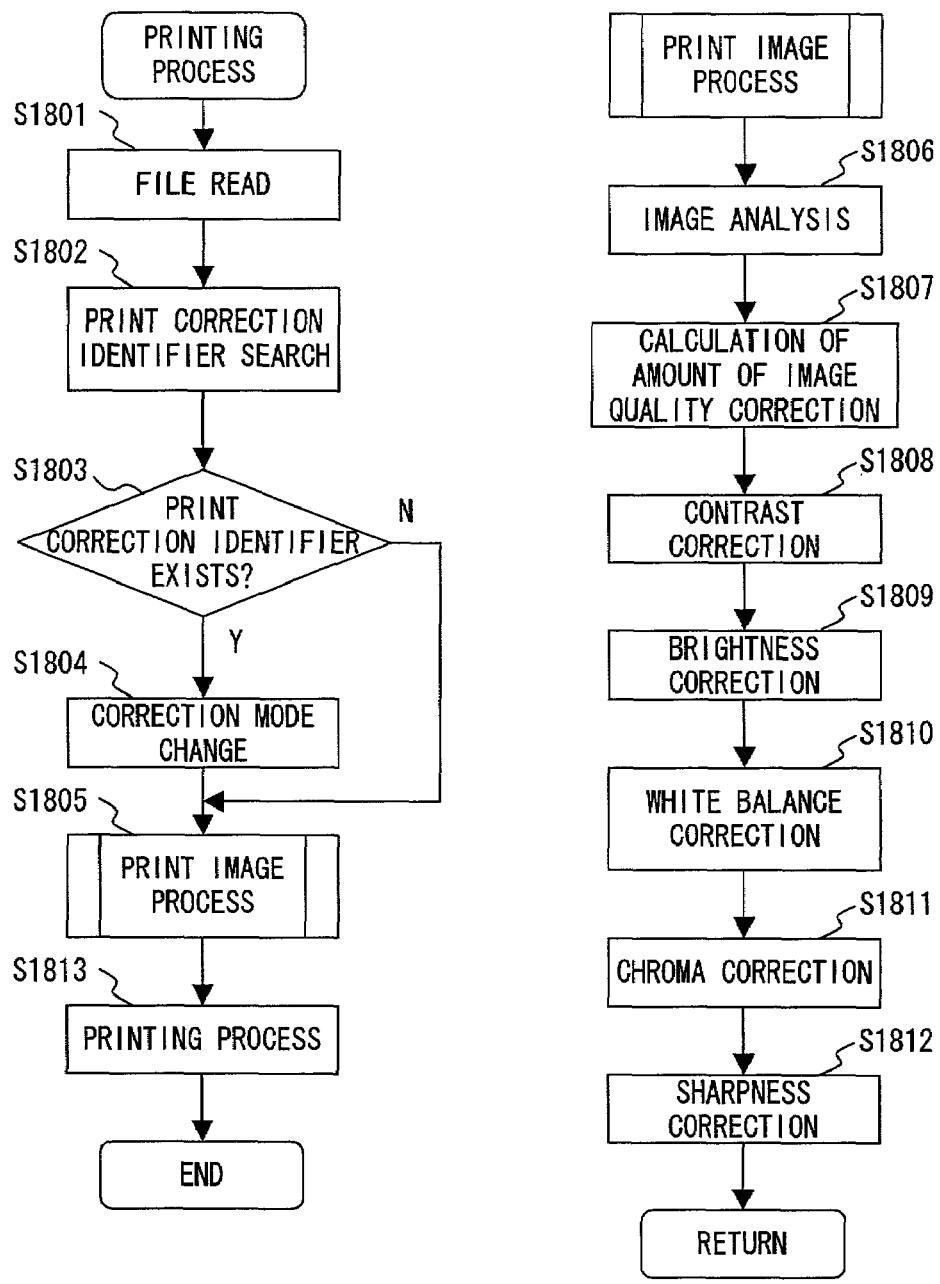
FIG. 18 is a flowchart exemplifying a printing process performed by a printer according to the third preferred embodiment.

FIG. 18 is a flowchart exemplifying the printing process performed by the printer 63.

The flow shown in this figure is a process that is started when a memory card is inserted into the card slot 34, and a print instruction is given for an image of a predetermined image file among image files recorded on the memory card. At this time, a user may also instruct a correction mode used when a print image process is performed. By default, "standard" is set as a correction mode.

As shown in FIG. 18, when the print instruction is given for the image of the predetermined image file, the image file is read (S1801).

Then, a print correction identifier is searched in the supplementary information of the image file (S1802), and it is determined whether or not the print correction identifier exists (S1803). If the print correction identifier exists ("Y" in S1803), the set correction mode is changed to the correction mode indicated by print correction information within the supplementary information (S1804). If the print correction identifier does not exist ("N" in S1803), the correction mode is not changed, and the process of S1804 is skipped.

Then, the print image process (image forming process) is performed (S1805). This process is performed according to the flow shown on the right side of FIG. 18. Firstly, an image based on the image data of the image file is analyzed (S1806). Note that the image data analyzed at this time is image data for which the decompression process has performed by the ASIC unit 32.

Next, the amount of image quality correction, which is used in each of subsequent correction processes in S1808 to S1812 is calculated based on a result of the image analysis and the set correction mode (S1807). If the image file is an image file having a print correction identifier, the amount of image quality correction, which is used in each of the correction processes, is calculated based on the result of the image analysis, the set correction mode, and the print correction value of the print correction information within the supplementary information. For instance, if the image file is that shown in FIG. 16B, the amount of image quality correction, which is used in a contrast correction process (S1808), is calculated based on the result of the image analysis, the correction mode "standard", and the print correction value "70" of the contrast. If a corresponding print correction value does not exist, the amount of image quality correction is calculated based on the result of the image analysis, and the set correction mode.

After the amount of image quality correction used in each of the correction processes is calculated in this way, the subsequent correction processes are performed based on the calculated amount of image quality correction. Namely, a contrast correction process is performed based on the amount of image quality correction of contrast (S1808), a brightness correction process is performed based on the amount of image quality correction of brightness (S1809), a white balance correction process is performed based on the amount of image quality correction of white balance (S1810), a chroma correction process is performed based on the amount of image quality correction of chroma (S1811), and a sharpness correction process is performed based on the amount of image quality correction of sharpness (S1812). Here, the flow returns.

When the image data of the print image is generated in this way, the printing process is performed for the print image actually on paper (S1813). Here, this flow is terminated.

According to such a flow, the printer 63 can form a print image based on a predetermined print correction value that is selected by the electronic camera 61 based on an image process parameter prerecorded on a memory card. Namely, the printer 63 can form a print image based on an image process parameter prerecorded on a memory card.

In the flow shown in FIG. 18, the processes up to the generation of a print image (S1812) may be performed by the PC 65, or another image forming apparatus.

Additionally, with the electronic camera 61 according to the third preferred embodiment, an image file (including image data and print correction information) is output (recorded) to a memory card. However, the image file may be output to an external device such as a display device, a PC, an external recording device, etc., which is connected to the external input/output terminal 15. Besides, the electronic camera 61 may be configured to be connectable to a communications line, via which data (an image file, etc.) may be exchanged.

Furthermore, the printer 63 according to the third preferred embodiment obtains an image file from a memory card. However, the printer 63 may obtain the image file, for example, via a communications cable, a communications line, etc., which is connected to the above described external input/output terminal.

As stated earlier, according to the third preferred embodiment, the user load of making various settings of an electronic camera can be reduced without restricting the original role of recording image data, which a recording medium plays.

As described above in detail, according to the present invention, the shooting intention of a user can be accurately reflected when a visible image is formed, without imposing a load on the user. Additionally, the user load of making the settings of an image forming instruction, such as the printing, the display, etc. of a shot image, when a visible image is formed can be eliminated. Furthermore, the user load of making the settings of an electronic camera can be reduced without restricting the original role of a recording medium.

The present invention was described in detail above. However, the present invention is not limited to the above provided embodiments, and may be improved and modified within the scope of the gist of the present invention, as a matter of course.

What is claimed is:

1. An image capturing device, comprising:
an image capturing unit capturing an image of a subject, and outputting an image signal;
an image processing unit obtaining image data in a predetermined format based on the image signal output by the image capturing unit;
a setting unit setting an image capturing condition for capturing the image of the subject;
a storing unit storing a plurality of pieces of first correction information and a plurality of pieces of second correction information used when a visible image is formed at an external device based on the image data,
the first correction information being correction information for correcting the image data at the external device based on the image capturing condition set by the setting unit,
the second correction information being correction information for preventing at least a part of a correction process based on the first correction information from being performed when the image data is corrected at the external device based on the first correction information;
a selecting unit selecting first correction information corresponding to the image capturing condition set by the setting unit from among the plurality of pieces of first correction information stored in the storing unit; and
an outputting unit associating the first correction information selected by the selecting unit corresponding to the image capturing condition and the second information corresponding to the first correction information with image data, and outputting the first correction information and the second correction information in association with the image data to the external device,
wherein the setting unit setting the image capturing condition comprises:
a first setting unit selecting one state from a plurality of predetermined shooting states, and setting a predetermined shooting mode; and
a second setting unit capable of setting a predetermined correction condition in accordance with a state of a subject regardless of the shooting mode, and
wherein a priority in the plurality of shooting modes is assigned to the respective shooting modes set by the first setting unit, and the shooting mode with a high priority is set when the plurality of shooting modes are set prior to shooting.

2. An image capturing device, comprising:
an image capturing unit capturing an image of a subject, and outputting an image signal;
an image processing unit obtaining image data in a predetermined format based on the image signal output by the image capturing unit;
a setting unit setting an image capturing condition for capturing the image of the subject;
a storing unit storing a plurality of pieces of first correction information and a plurality of pieces of second correction information used when a visible image is formed at an external device based on the image data,
the first correction information being correction information for correcting the image data at the external device based on the image capturing condition set by the setting unit,
the second correction information being correction information for preventing at least a part of a correction process based on the first correction information from being performed when the image data is corrected at the external device based on the first correction information;
a selecting unit selecting first correction information corresponding to the image capturing condition set by the setting unit from among the plurality of pieces of first correction information stored in the storing unit; and an outputting unit associating the first correction information selected by the selecting unit corresponding to the image capturing condition and the second information corresponding to the first correction information with image data, and outputting the first correction information and the second correction information in association with the image data to the external device, wherein the setting unit setting the image capturing condition comprises:

a first setting unit selecting one state from a plurality of predetermined shooting states, and setting a predetermined shooting mode; and a second setting unit capable of setting a predetermined correction condition in accordance with a state of a subject regardless of the shooting mode, and wherein the shooting mode settable by the first setting unit is one of a scene mode, a filter mode in which sepia or monochrome is settable, a strobe mode, and a view angle mode in which predetermined angle is set, and priority is assigned in the order of the scene mode, the filter mode, the strobe mode, and the view angle mode.

3. An image capturing device, comprising:

an image capturing unit capturing an image of a subject, and outputting an image signal;

an image processing unit obtaining image data in a predetermined format based on the image signal output by the image capturing unit;

a setting unit setting an image capturing condition for capturing the image of the subject;

a storing unit storing a plurality of pieces of first correction information and a plurality of pieces of second correction information used when a visible image is formed at an external device based on the image data, the first correction information being correction information for correcting the image data at the external device based on the image capturing condition set by the setting unit, the second correction information being correction information for preventing at least a part of a correction process based on the first correction information from being performed when the image data is corrected at the external device based on the first correction information;

a selecting unit selecting first correction information corresponding to the image capturing condition set b the setting unit from among the plurality of pieces of first correction information stored in the storing unit; and an outputting unit associating the first correction information selected by the selecting unit corresponding to the image capturing condition and the second information corresponding to the first correction information with image data, and outputting the first correction information and the second correction information in association with the image data to the external device, wherein the setting unit setting the image capturing condition comprises:

a first setting unit selecting one state from a plurality of predetermined shooting states, and setting a predetermined shooting mode; and a second setting unit capable of setting a predetermined correction condition in accordance with a state of a subject regardless of the shooting mode, and wherein the correction condition set by the second setting unit is one of luminance of scene, subject distance, shutter speed, aperture, strobe, and view angle, and a priority is assigned in the order of the luminance of scene, the subject distance, the shutter speed, the aperture, the strobe, and the view angle.

4. An image capturing device, comprising:

an image capturing unit an image of a subject, and outputting an image signal;

an image processing unit obtaining image data in a predetermined format based on the image signal output by the image capturing unit;

a setting unit setting an image capturing condition for capturing the image of the subject;

a storing unit storing a plurality of pieces of first correction information and a plurality of pieces of second correction information used when a visible image is formed at an external device based on the image data, the first correction information being correction information for correcting the image data at the external device based on the image capturing condition set by the setting unit, the second correct ion information being connection information for preventing at least a part of a correction process based on the first correction information from being performed when the image data is corrected at the external device based on the first correction information;

a selecting unit selecting first correction information corresponding to the image capturing condition set by the setting unit from among the plurality of pieces of first correction information stored in the storing unit; and an outputting unit associating the first correction information selected by the selecting unit corresponding to the image capturing condition and the second information corresponding to the first correction information with image data, and outputting the first correction information and the second correction information in association with the image data to the external device, wherein the setting unit setting the image capturing condition comprises:

a first setting unit selecting one state from a plurality of predetermined shooting states, and setting a predetermined shooting mode; and a second setting unit capable of setting a predetermined correction condition in accordance with a state of a subject regardless of the shooting mode, and wherein an item set by the first setting unit is prioritized higher than an item set by the second setting unit.

5. An image capturing device, comprising: an image capturing unit an image of a subject, and outputting an image signal;

an image processing unit obtaining image data in a predetermined format based on the image signal output by the image capturing unit;

a setting unit setting an image capturing condition for capturing the image of the subject;

a shooting mode selecting unit selecting a mode for shooting from among a plurality of shooting modes;

a storing unit storing image forming instruction information used when a visible image is formed at an external device based on the image data, the image forming instruction information stored in the storing unit comprising first correction information for correcting the image data at the external device based on the image capturing condition set by the setting unit, second correction information for correcting the image data at the external device based on the shooting mode selected by the shooting mode selecting unit, and third correction information for preventing at least a part of a correction process on the first correction information and the second correction information from being performed when the image data is corrected at the external device based on the first correction information and the second correction information;

a selecting unit selecting the first correction information or the second correction information stored in the storing unit based on the image capturing condition set by the setting unit or the shooting mode selected by the shooting mode selecting unit; and an outputting unit associating one of the first correction information and the second correction information selected by the selecting unit, and the third correction information corresponding to the selected first correction information or second correction information, with the image data, and outputting the first correction information or the second correction information, and the third correction information in association with the image data to the external device, wherein a priority is assigned to between the image capturing condition set by the setting unit and the shooting mode selected by the shooting mode selecting unit, and the shooting mode is prioritized when the image capturing condition and the shooting mode are simultaneously set and selected.

6. The image capturing device according to claim 5, wherein a priority in the plurality of image capturing conditions is assigned to the respective image capturing conditions set by the setting unit.

7. The image capturing device according to claim 6, wherein the image capturing condition set by the setting unit is one of luminance of scene, subject distance, shutter speed, aperture, strobe, and view angle, and the priority is assigned in the order of the luminance of scene, the subject distance, the shutter speed, the aperture, the strobe, and the view angle.

8. The image capturing device according to claim 5, wherein a priority in the plurality of shooting modes is assigned to the respective shooting modes selected by the shooting mode selecting unit.

9. The image capturing device according to claim 8, wherein the shooting mode set by the shooting mode selecting unit is one of a scene mode, a filter mode in which sepia or monochrome is settable, a strobe mode, and a view angle mode in which predetermined angle is set, and the priority is assigned in the order of the scene mode, the filter mode, the strobe mode, and the view angle.

* * * * *